United States Patent
Bulleit et al.

(10) Patent No.: US 7,860,946 B1
(45) Date of Patent: Dec. 28, 2010

(54) SYSTEMS, METHODS, AND COMPUTER-READABLE MEDIA FOR SEARCHING AND CONCOMITANTLY INTERACTING WITH MULTIPLE INFORMATION CONTENT PROVIDERS, OTHER INDIVIDUALS, RELEVANT COMMUNITIES OF INDIVIDUALS, AND INFORMATION PROVIDED OVER A NETWORK

(75) Inventors: Douglas A. Bulleit, Tiger, GA (US); Bharat Aluri, Atlanta, GA (US)

(73) Assignee: Disintegrated Communication Systems, LLC, Tiger, GA (US)

( * ) Notice: Subject to any disclaimer, the term of this patent is extended or adjusted under 35 U.S.C. 154(b) by 429 days.

(21) Appl. No.: 11/985,893

(22) Filed: Nov. 19, 2007

Related U.S. Application Data

(60) Provisional application No. 60/927,060, filed on May 1, 2007.

(51) Int. Cl.
*G06F 15/16* (2006.01)
(52) U.S. Cl. .................... 709/218; 715/738
(58) Field of Classification Search .............. 709/218; 715/738
See application file for complete search history.

(56) References Cited

U.S. PATENT DOCUMENTS

| | | | | |
|---|---|---|---|---|
| 5,929,854 A * | 7/1999 | Ross | ............ | 715/783 |
| 6,182,116 B1 * | 1/2001 | Namma et al. | ........ | 709/204 |
| 6,493,000 B1 * | 12/2002 | Wynn et al. | ........ | 715/733 |
| 6,604,108 B1 * | 8/2003 | Nitahara | ............ | 1/1 |
| 6,708,172 B1 * | 3/2004 | Wong et al. | ........ | 1/1 |
| 6,832,355 B1 * | 12/2004 | Duperrouzel et al. | ........ | 715/788 |
| 7,117,434 B2 * | 10/2006 | Novaes | ............ | 715/272 |
| 7,583,405 B2 * | 9/2009 | Harrington et al. | ........ | 709/218 |
| 2002/0054053 A1 * | 5/2002 | Naimi et al. | ........ | 345/700 |
| 2003/0083073 A1 * | 5/2003 | Cossins et al. | ........ | 455/446 |
| 2003/0204815 A1 * | 10/2003 | Edwards et al. | ........ | 715/513 |
| 2003/0212760 A1 * | 11/2003 | Chen et al. | ........ | 709/218 |
| 2004/0068458 A1 * | 4/2004 | Russo | ............ | 705/36 |
| 2004/0141013 A1 * | 7/2004 | Alcazar et al. | ........ | 345/847 |
| 2005/0081155 A1 * | 4/2005 | Martin et al. | ........ | 715/719 |
| 2005/0172018 A1 * | 8/2005 | Devine et al. | ........ | 709/223 |
| 2005/0240873 A1 * | 10/2005 | Czerwinski et al. | ........ | 715/740 |
| 2006/0085741 A1 * | 4/2006 | Weiner et al. | ........ | 715/517 |
| 2007/0159605 A1 * | 7/2007 | De Vaan | ............ | 353/31 |
| 2009/0248524 A1 * | 10/2009 | Defoy et al. | ........ | 705/14.1 |

OTHER PUBLICATIONS

"Introducing OpenRide" AOL LLC, downloaded Jul. 24, 2008 from http://web.archive.org/web/20061017141933/free.aol.com/thenewaol/openride, 7 pages.
"About AOL OpenRide" AOL LLC, downloaded Jul. 24, 2008 from http://help.channels.aol.com/kjump.adp?articleId=222250, 2 pages.

* cited by examiner

*Primary Examiner*—Ajay Bhatia
(74) *Attorney, Agent, or Firm*—Hope Baldauff Hartman, LLC

(57) ABSTRACT

Methods, systems, and computer-readable media for searching and concomitantly interfacing with multiple information providers, relevant individuals and communities, and information provided over a network are provided. A single interface including windows is provided. User interactions with the windows of the single interface are monitored, and information from one or more network resources is provided to the single interface based at least in part on the monitored user interactions with the windows.

16 Claims, 27 Drawing Sheets

SYSTEMS, METHODS, AND COMPUTER-READABLE MEDIA FOR SEARCHING AND CONCOMITANTLY INTERACTING WITH MULTIPLE INFORMATION CONTENT PROVIDERS, OTHER INDIVIDUALS, RELEVANT COMMUNITIES OF INDIVIDUALS, AND INFORMATION PROVIDED OVER A NETWORK

CROSS REFERENCE TO RELATED APPLICATIONS

The present application claims priority under 35 U.S.C. §119 to U.S. provisional application No. 60/927,060 entitled "Systems, Methods, and Computer-Readable Media for Searching and Concomitantly Interfacing with Multiple Information Content Providers, Other Individuals, Relevant Communities of Individuals, and Information Provided over a Network" filed on May 1, 2007, and which is expressly incorporated in its entirety herein by reference.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the United States Patent and Trademark Office patent files or records, but otherwise reserves all copyrights whatsoever.

BACKGROUND

Utilizing network resources to access information, communicate with others, and manage personal content has become ubiquitous in society. Many individuals access the Internet to conduct research, to converse and interact with others sharing similar issues or concerns in community settings, such as blogs and vlogs, and to access electronic mail services to send and receive correspondence. However, to manage and access each of these tasks, individuals have to juggle and switch between multiple, disintegrated browser instances to view website content, website communities, and electronic emails at the same time, which can be inefficient and frustrating to the users.

Additionally, users typically have to provide search input to a search engine associated with the Internet in order to locate web-based information and communities relevant to the users' needs. Because of the colossal amount of information, content, and resources provided over the Internet, these searches often produce a multitude of results which may or may not be on point with the users' needs. For example, a user may enter the search input "managing diabetes over forty" into a search engine in hopes of finding a network community pertaining to managing diabetes for people over forty. Although an appropriate result associated with a community discussing managing diabetes over forty may be provided by the search engine, the appropriate result may be buried under numerous other results directed to articles, books, and companies associated with diabetes management. The user may become discouraged while searching through the provided results and stop looking for a matching result before finding the link corresponding to the desired community.

Thus, there is a need for a single, integrated view of multiple web-based information and content to help users consume and manage the information. There is a further need to provide more direct searching of web-based information and on-point results based on the searching.

SUMMARY

In accordance with exemplary embodiments, the above and other problems are addressed by providing methods, systems, and computer-readable media for searching and concomitantly interfacing with multiple information providers, relevant individuals and communities, and information provided over a network. According to exemplary embodiments, a method is provided for accessing information over a network. A single interface including windows is provided. User interactions with the windows of the single interface are monitored, and information from one or more network resources is provided to the single interface based at least in part on the monitored user interactions with the windows.

In accordance with further exemplary embodiments, a computer-readable medium is provided having computer-executable instructions stored thereon which, when executed by a computer, cause the computer to provide a single interface including windows. User interactions with the windows of the single interface are monitored. According to exemplary embodiments, one of the monitored user interactions includes providing a search input. The search input is received through one of the windows of the single interface and is enhanced. Information from one or more network resources is provided to the single interface based at least in part on the enhanced search input.

According to exemplary embodiments, a method for providing network-based information is provided. Categories associated with a business vertical are received, and network resources are searched for network-based information associated with the categories. The network-based information associated with the categories is prioritized based on a relevancy between the network-based information and the categories. A request for a portion of the prioritized network-based information is received, and the portion of the prioritized network-based information is provided via a single interface including windows.

In accordance with further exemplary embodiments, a method for providing network-based information is provided. Categories defining a business vertical are received, and search input associated with the categories is received. A search is conducted for network-based information provided by network resources that is associated with the search input. A result of the search of the network-based information is displayed in a manner that indicates which of the categories or a combination of the categories is associated with the result.

Other systems, methods, and/or computer readable media according to embodiments will be or become apparent to one with skill in the art upon review of the following drawings and detailed description. It is intended that all such additional systems, methods, and/or computer readable media be included within this description, be within the scope of the exemplary embodiments, and be protected by the accompanying claims.

DETAILED DESCRIPTION

Figure 1:
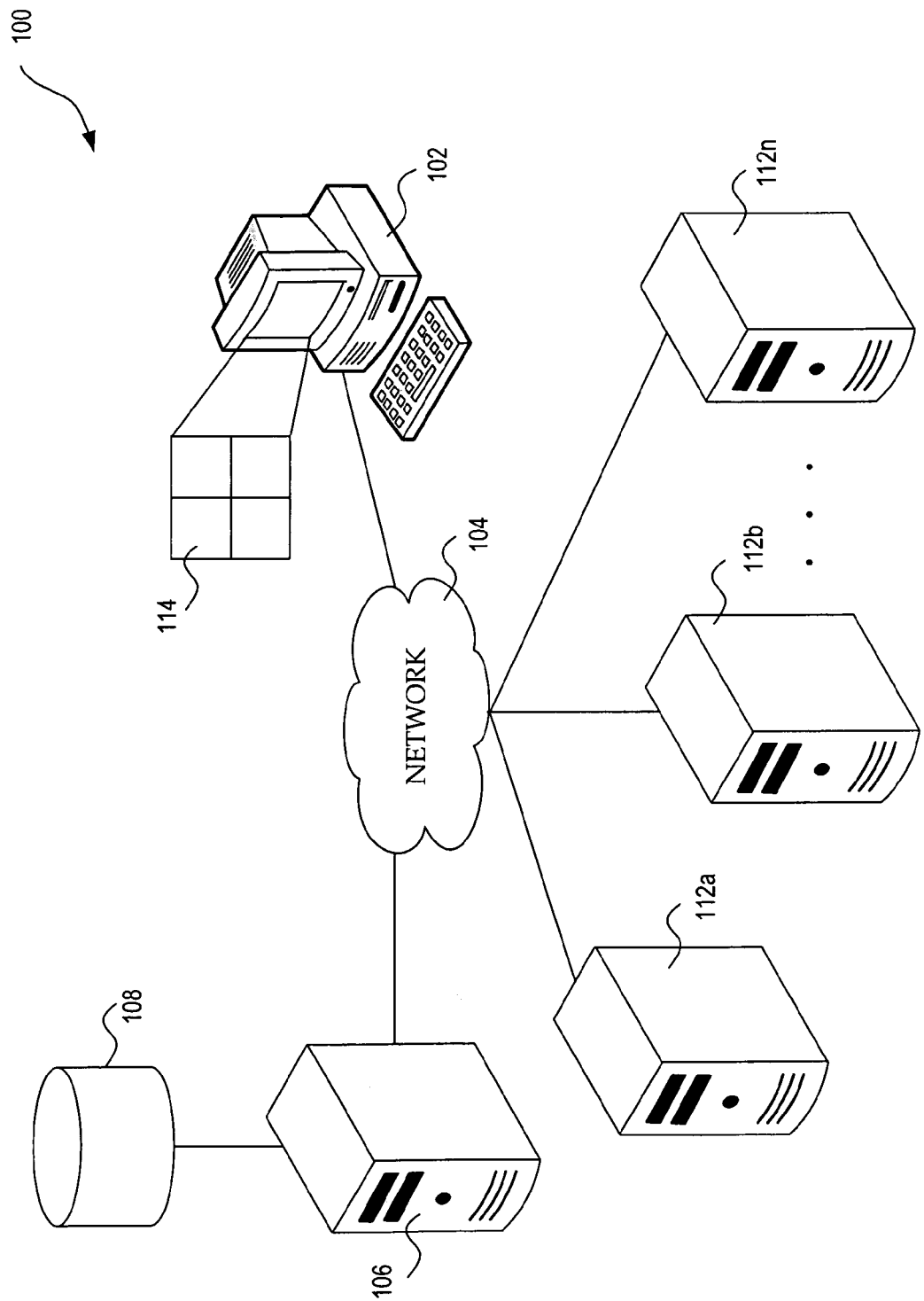
FIG. 1 is a high-level diagram of an architecture for providing and managing a multi-view interface that is accessible through a network according to exemplary embodiments.

Exemplary embodiments provide methods, systems, and computer-readable media for providing and managing a multi-view interface that is accessible through a network, such as an Internet Protocol (IP)-based network, and that provides one or more windows, also referred to herein as panes, through which users can send and receive electronic messages, view and interact with relevant communities over the network, search for and interact with information provided over the network, and manage personal content associated with the users, such as medical issues associated with the users. The panes of the multi-view interface support multiple simultaneous presentations of information supported by network-based servers through, according to exemplary embodiments, a single browser instance. For example, a first pane of the multi-view interface may provide a home website selected by a user while, at the same time, a second pane provides a user's web-based electronic mail service website and a third pane provides links to community websites in which the user may be interested. The user's interaction with the panes of the multi-view interface provides information that may be used to determine further web-based information to provide to the user through one or more of the multiple panes and/or through other locations within the browser instance. Thus, the end user is provided with a multi-view experience via the single multi-view interface which integrates branded information, unbranded information, biometrics and other information within more relevant virtual communities. By providing numerous avenues of information within a single visual display, the multiple windows integrated into the single multi-view interface empowers an end user to manage complex and/or unfamiliar information/transaction challenges such as, but not limited to, managing health care.

In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which exemplary embodiments may be implemented. While exemplary embodiments will be described in the general context of program modules that execute in conjunction with an application program that runs on an operating system on a computer system, those skilled in the art will recognize that the exemplary embodiments may also be implemented in combination with other program modules.

Generally, program modules include routines, programs, components, data structures, and other types of structures that perform particular tasks or implement particular abstract data types. Moreover, those skilled in the art will appreciate that exemplary embodiments may be practiced with other computer system configurations, including hand-held devices, multiprocessor systems, microprocessor-based or programmable consumer electronics, minicomputers, mainframe computers, and the like. Exemplary embodiments may also be practiced in distributed computing environments where tasks are performed by remote processing devices that are linked through a communications network. In a distributed computing environment, program modules may be located in both local and remote memory storage devices.

Referring now to FIG. 1, an illustrative operating environment 100 for various exemplary embodiments will be described. As shown in FIG. 1, a network 104 interconnects a user device 102, one or more multi-view interface server computers 106, and one or more content/application server computers 112a-112n. It should be appreciated that the network 104 may comprise any type of computing network, including a local area network or a wide area network, such as the Internet. The network 104 provides a medium for enabling communication between the user device 102, the multi-view interface server computer 106, and the server computers 112a-112n. The multi-view interface server computer 106 may directly communicate with a database 108 for storing and accessing user profile information, user contexts, business rules, taxonomy associated with a multi-view interface 114 provided by the multi-view interface server computer, stored links to Internet content, and tags associated with the stored links and the taxonomy as further described herein. Alternatively, the multi-view interface server computer 106 may communicate with the database 108 via the network 104, or the database may be integrated with the multi-view interface server computer.

Figure 2A:
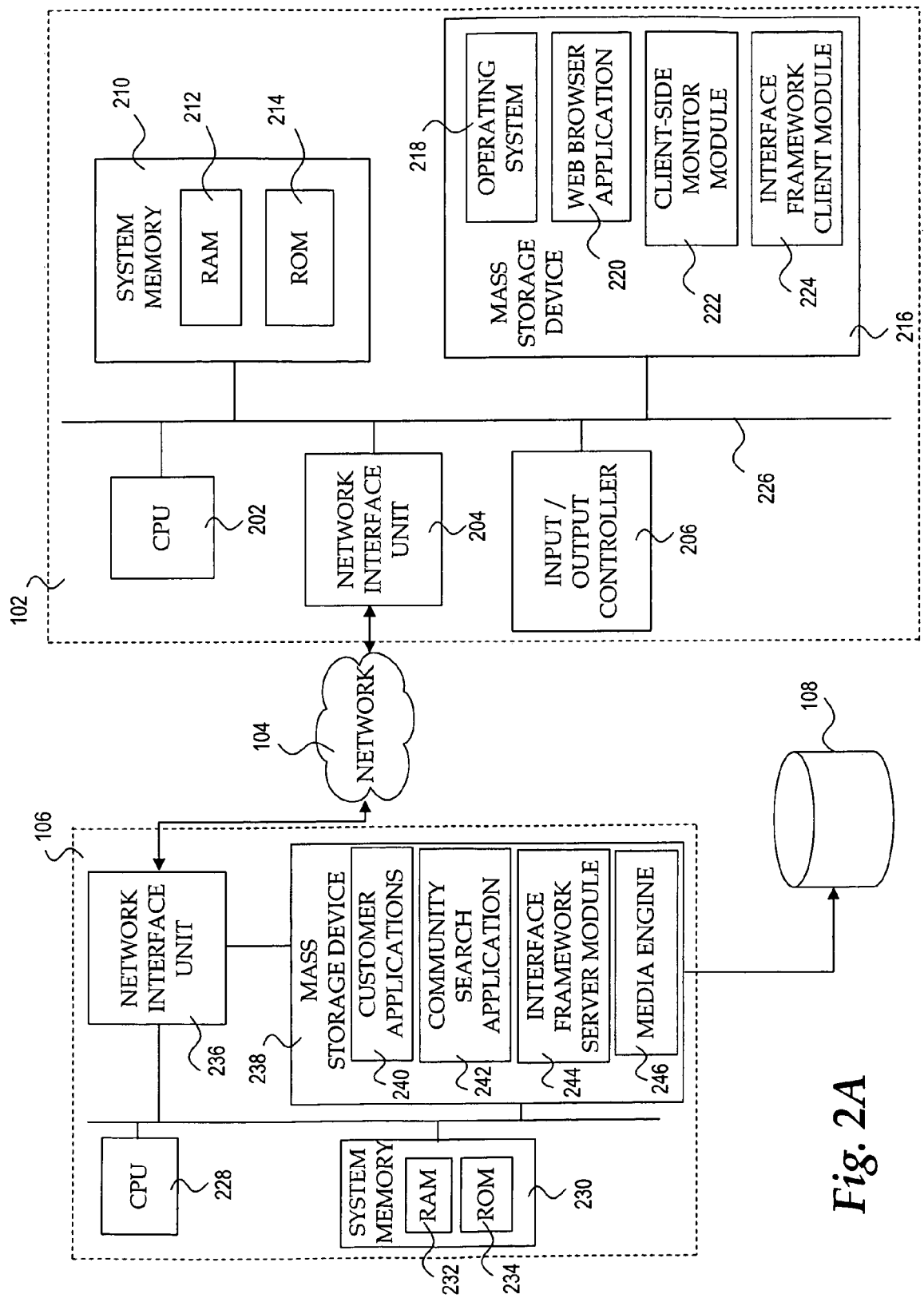
FIGS. 2A-2B are block diagrams illustrating a user device and a multi-view interface server computer for providing and managing a multi-view interface according to exemplary embodiments.
Figure 2B:
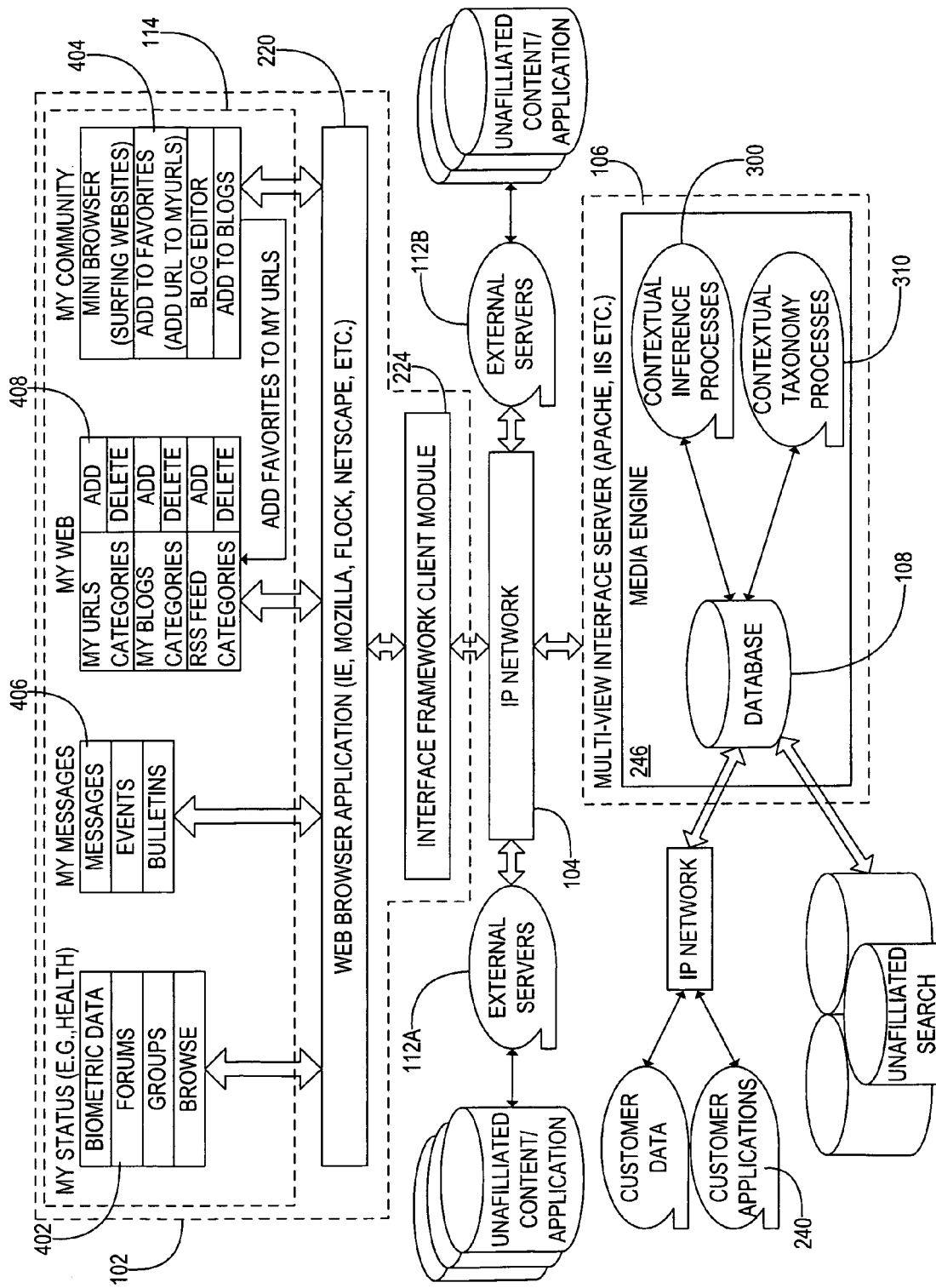

As illustrated in FIGS. 2A and 2B, the user device 102 may comprise a general purpose desktop or laptop computer capable of executing one or more application programs. In particular, according to various embodiments, the user device 102 is operative to execute a web browser application 220, such as, but not limited to, the INTERNET EXPLORER browser, the FIREFOX browser, the FLOCK browser, and/or the NETSCAPE browser, and an interface framework client module 224 from a mass storage device 216 of the user device for retrieving, viewing, and interacting with content provided by the server computers 112a-112n via the multi-view interface 114 provided by the multi-view interface server computer 106. According to exemplary embodiments, the multi-view interface 114 includes a plurality of windows such as, for example, four windows, each of which presents different functionality for the user in a single browser instance, as further described herein. The windows may include a messaging window for sending and receiving electronic mail; a web window for searching the Internet; a community window for receiving and interacting with communities such as blogs, vlogs, and forums relevant to requests received at the community window; and a status window which may include biometrics or other types of measurements for disease management, each of which is discussed further below. The interface framework client module 224 may be a client-side framework module, such as an AJAX framework module, for providing the multiple windows of the multi-view interface 114 in a single instance of the web browser application 220 when a universal resource locator ("URL") address associated with the multi-view interface server computer 106 is provided at the user device 102.

According to other exemplary embodiments, the user device 102 may also be operative to execute a client-side monitor module 222 from the mass storage device 216. As described herein, the client-side monitor module 222 may monitor the interactions a user has with the multi-view interface 114 and each of the windows of the multi-view interface and provide the interactions to a media engine 246 of the multi-view interface server computer 106, and more particularly to an inference engine 300 of the media engine, for use in determining what content from the server computers 112a-112n and/or associated with the multi-view interface server computer to provide to the user via the multi-view interface. The interactions monitored by the client-side monitor module 222 may include navigational interactions performed by the user including, but not limited to, selection of one or more of the windows of the multi-view interface 114, selection of drop-down menus associated with the multi-view interface and selection of links associated with the drop-down menus, URL input into the windows, and scrolling associated with the interface. According to exemplary embodiments, each user interaction with the multi-view interface 114 monitored by the client-side monitor module 222 is associated with an identification code such that when the user interacts with the multi-view interface, the client-side monitor module determines the associated identification codes for the interactions and provides the string of associated identification codes to a server-side monitor module 302 of the inference engine 300, illustrated in FIG. 3. The client-side monitor module 222 may include a threshold interaction amount such that a string of associated identification codes is not sent to the inference engine 300 until the amount of interaction meets or exceeds the threshold interaction amount. The user device 102 is further operative to execute an operating system 218, such as the WINDOWS XP operating system from MICROSOFT CORPORATION of Redmond, Wash., from the mass storage device 216.

The user device 102 may also include a central processing unit 202 ("CPU"); a system memory 210, including random access memory 212 ("RAM") and read-only memory ("ROM") 214; and a system bus 226 that couples the system memory to the CPU. A basic input/output system containing the basic routines that help to transfer information between elements within the device 102, such as during startup, may be stored in the ROM 214. The CPU 202 of the user device 102 is a standard central processor that performs arithmetic and logical operations necessary for the operation of the client computer. CPUs are well-known in the art, and therefore not described in further detail herein. The mass storage device 216 is connected to the CPU 202 through a mass storage controller (not shown) connected to the bus 226. The mass storage device 216 and its associated computer-readable media provide non-volatile storage for the user device 102. Although the description of computer-readable media contained herein refers to a mass storage device, such as a hard disk or CD-ROM drive, it should be appreciated by those skilled in the art that computer-readable media can be any available media that can be accessed by the user device 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the user device 102.

As discussed above and according to exemplary embodiments, the user device 102 may operate in a networked environment using logical connections to remote computers through the network 104, such as the Internet. The user device 102 may connect to the network 104 through a network interface unit 204 connected to the bus 226. It should be appreciated that the network interface unit 204 may also be utilized to connect to other types of networks and remote computer systems. The user device 102 may also include an input/output controller 206 for receiving and processing input from a number of other devices, including a keyboard, mouse, scanner, digital computer, or electronic stylus (not shown in FIG. 1). Similarly, the input/output controller 206 may provide output to a display screen for displaying the multi-view interface 114, a printer, or other type of output device.

It should be appreciated that the multi-view interface server computer 106 discussed briefly above may be a standard server computer including some or all of the conventional computing components described above relative to the user device 102. In particular, the multi-view interface server computer 106 may include a CPU 228; system memory 230 including RAM 232 and ROM 234; a network interface unit 236; and a mass storage device 238. The mass storage device 238 is operative to store and execute an interface framework server module 244 which may be a server-side framework module, such as an AJAX framework module, for providing the multi-view interface 114 to the user device 102 in response to receiving a request to display the interface from the user device 102.

Figure 7:
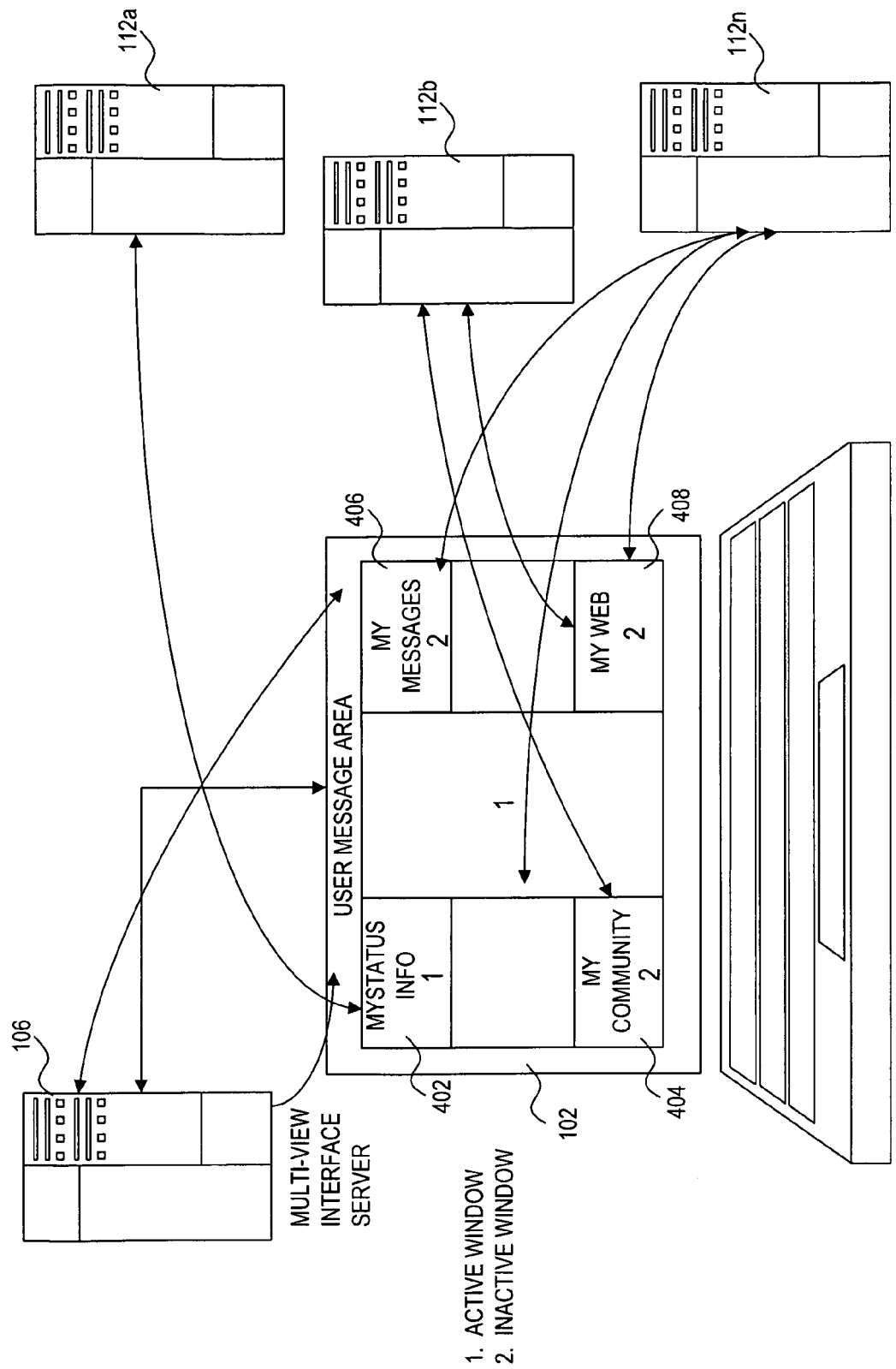
FIG. 7 is a block diagram illustrating communication between a user device, multi-view interface server computer, and content/application server computer according to exemplary embodiments.

According to exemplary embodiments, when the multi-view interface server computer 106 receives the request from the user device 102 to initiate the multi-view interface 114, the interface framework server module 244 contacts the appropriate URLs associated with one or more of the windows of the multi-view interface and connects the user device 102 with the corresponding websites and customer applications provided by server computers, such as the server computers 112a-112n, such that information provided by the corresponding websites and applications is displayed via the windows of the interface, as further illustrated in FIG. 7. The interface framework server module 244 may also access the taxonomy associated with the multi-view interface 114 and stored in the database 108 such that the associated taxonomy is displayed via the windows of the interface. The taxonomy may include the categories of information and the menu structure of that information provided to a user by the multi-view interface 114, as discussed further with regard to FIGS. 4C-4O. The taxonomy initially provided via the multi-view interface 114 may be customized based on preferences and/or objectives of a customer for providing access to the services provided by the multi-view interface 114 to users associated with the customer, such as the customer's employees. Therefore, according to exemplary embodiments, each employee of the customer will receive the same taxonomy upon initially accessing the multi-view interface 114. The customer may provide further customization for the taxonomy as the multi-view interface 114 is utilized by the customer's employees. Alternatively, the taxonomy initially provided via the multi-view interface 114 may be a standard taxonomy relevant to the subject matter of the multi-view interface. Whether the initial taxonomy is a customized taxonomy based on a customer's preferences or a standard taxonomy, the taxonomy provided by the multi-view interface 114 may be modified by a user and/or may be modified over time based on a user's interactions with the taxonomy. For example, if a user has not accessed a taxonomy category, such as a learning disability category, for a predetermined amount of time, such as six months, the taxonomy is modified to omit the learning disability category. Accordingly, the taxonomy provided by the multi-view interface 114 when a request from the user device 102 is received may be customized based on the particular user requesting the interface.

Figure 4A:
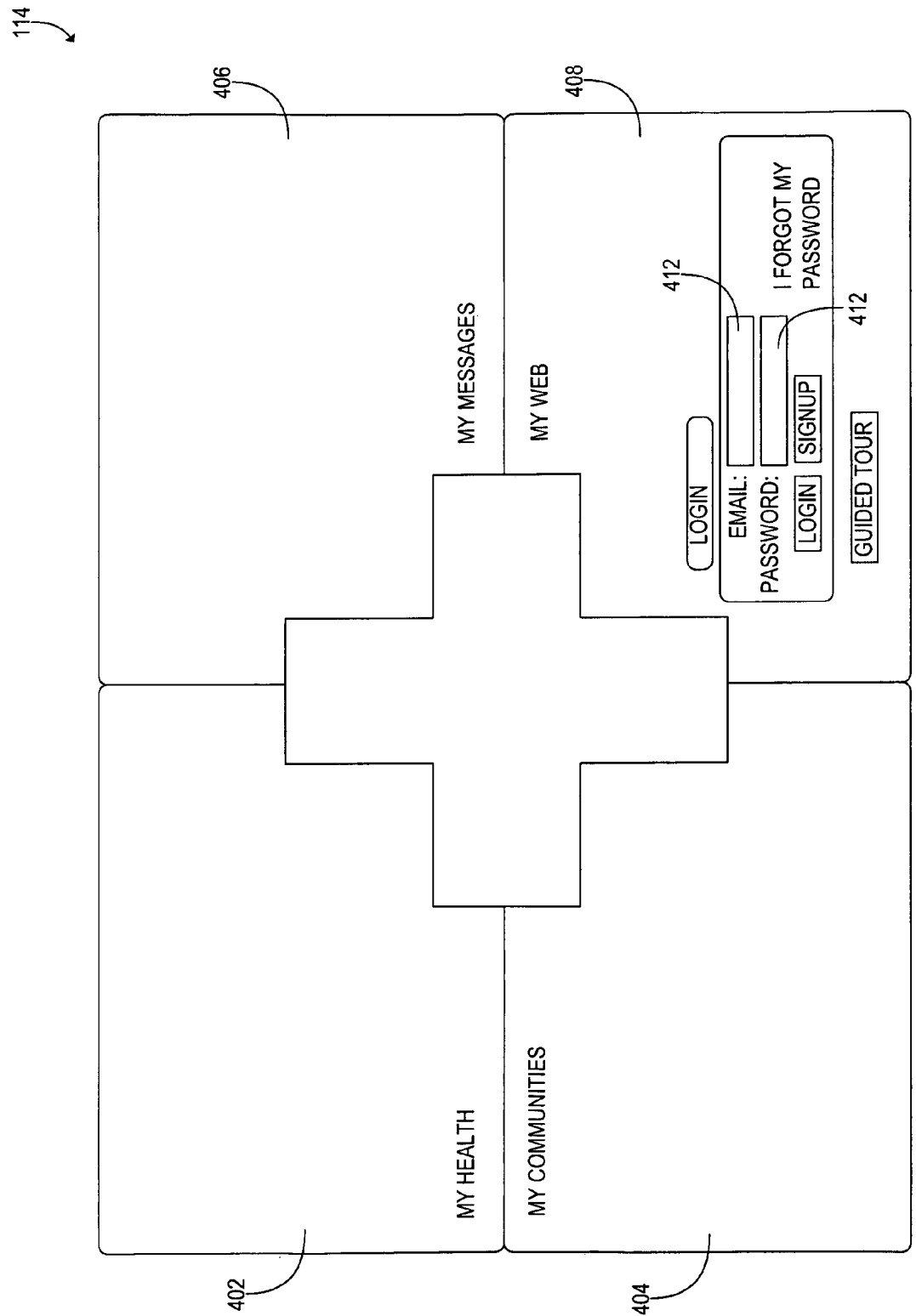
FIGS. 4A-4R are views provided by an exemplary embodiment of a multi-view interface.
Figure 4B:
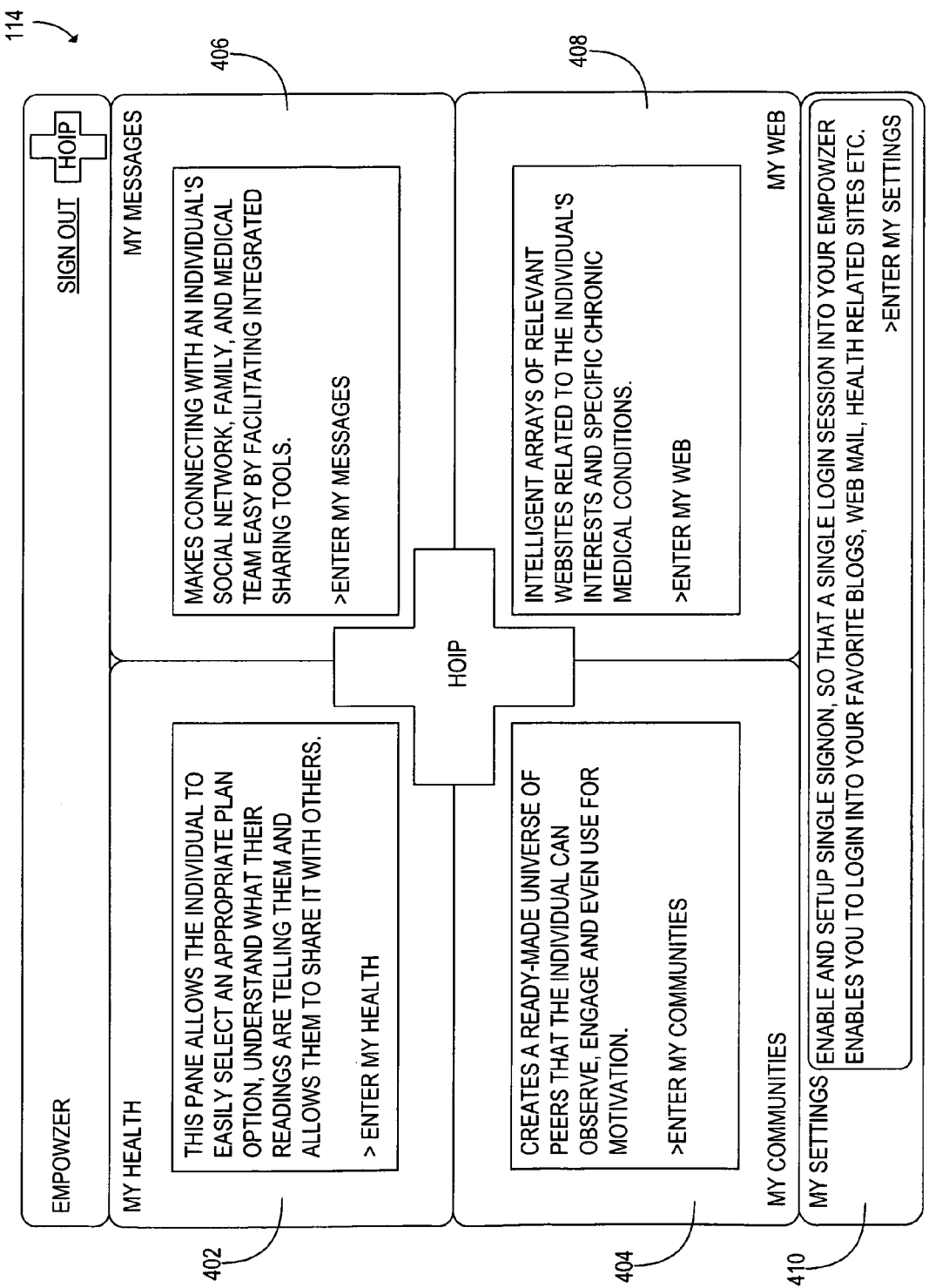
Figure 4C:
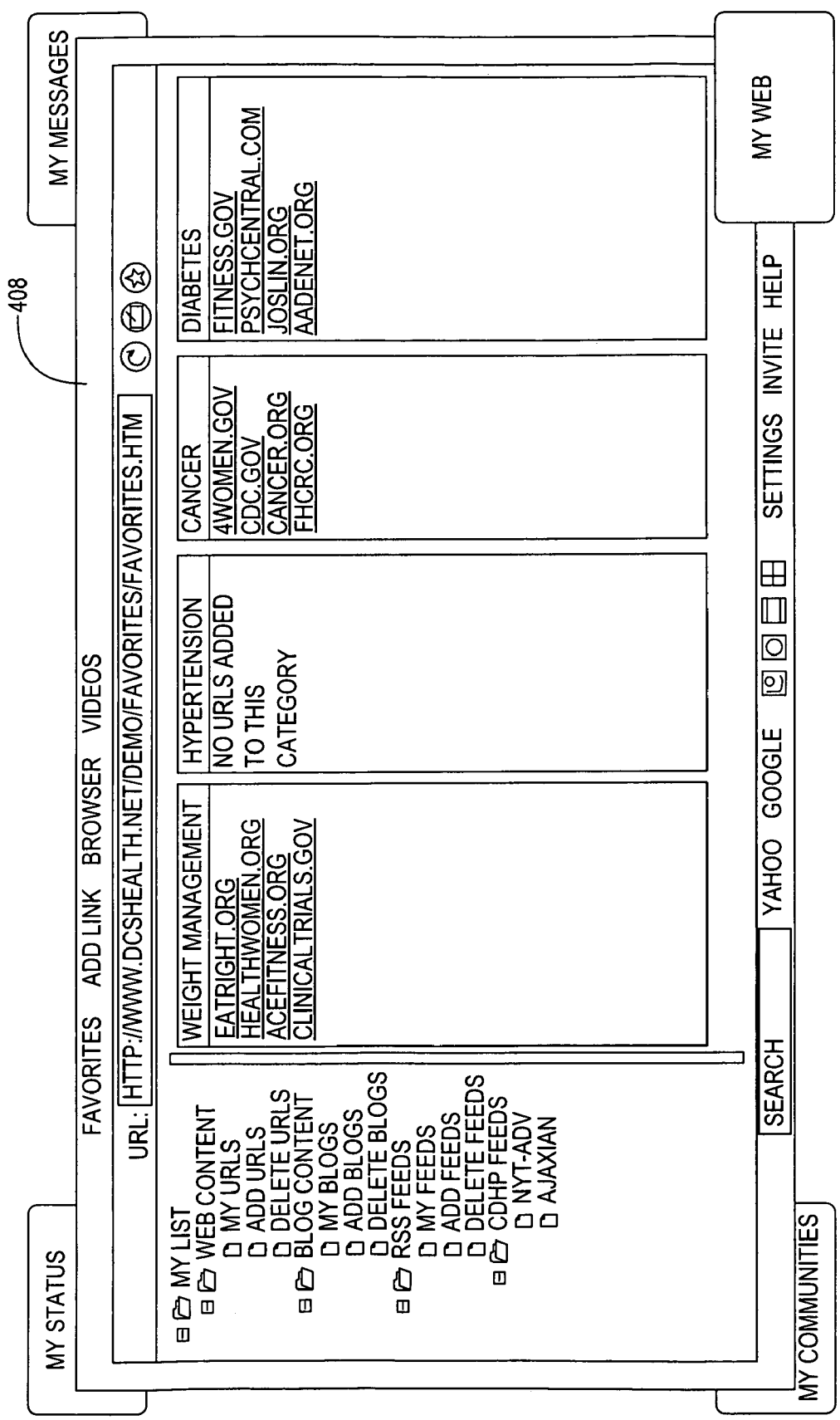
Figure 4D:
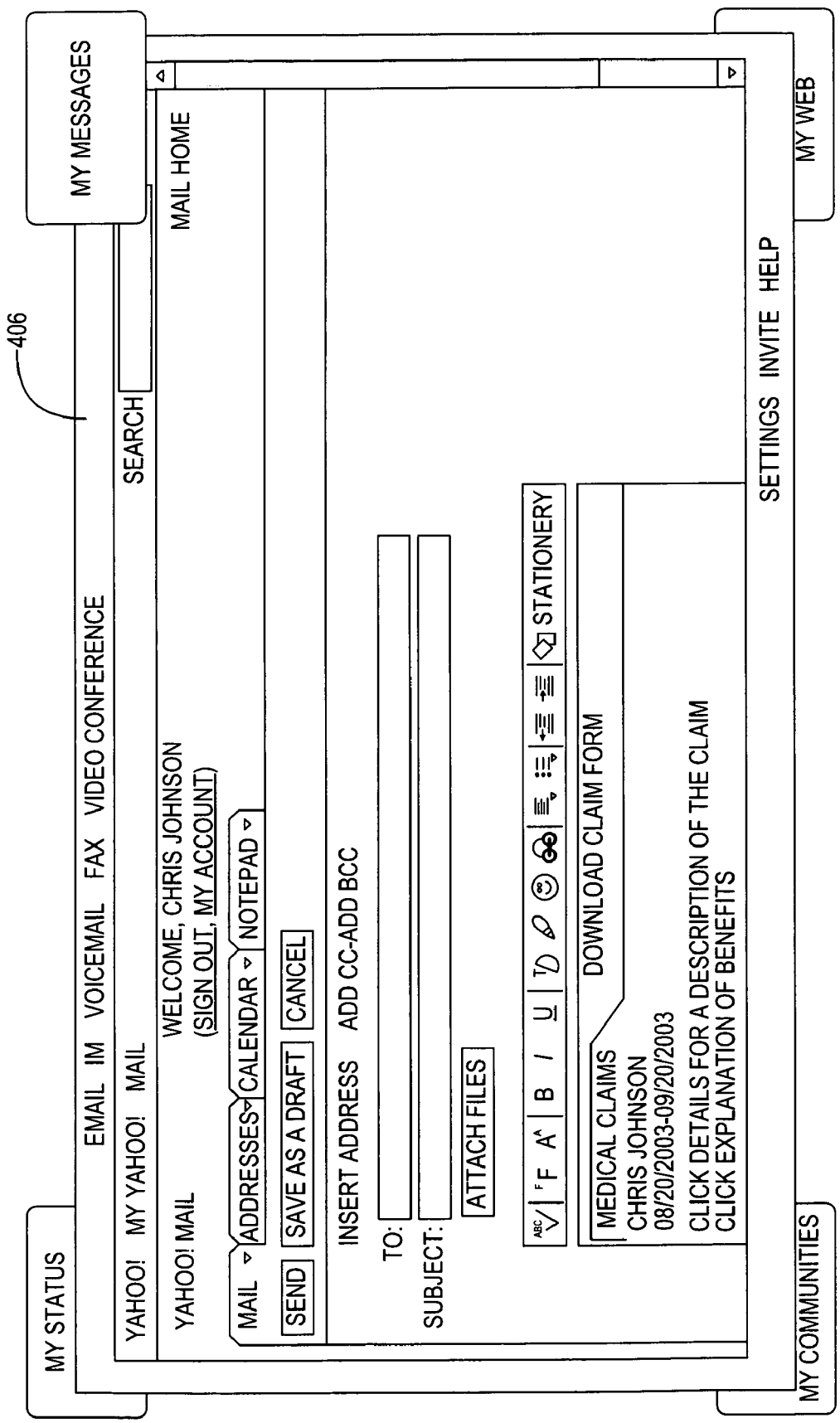
Figure 4E:
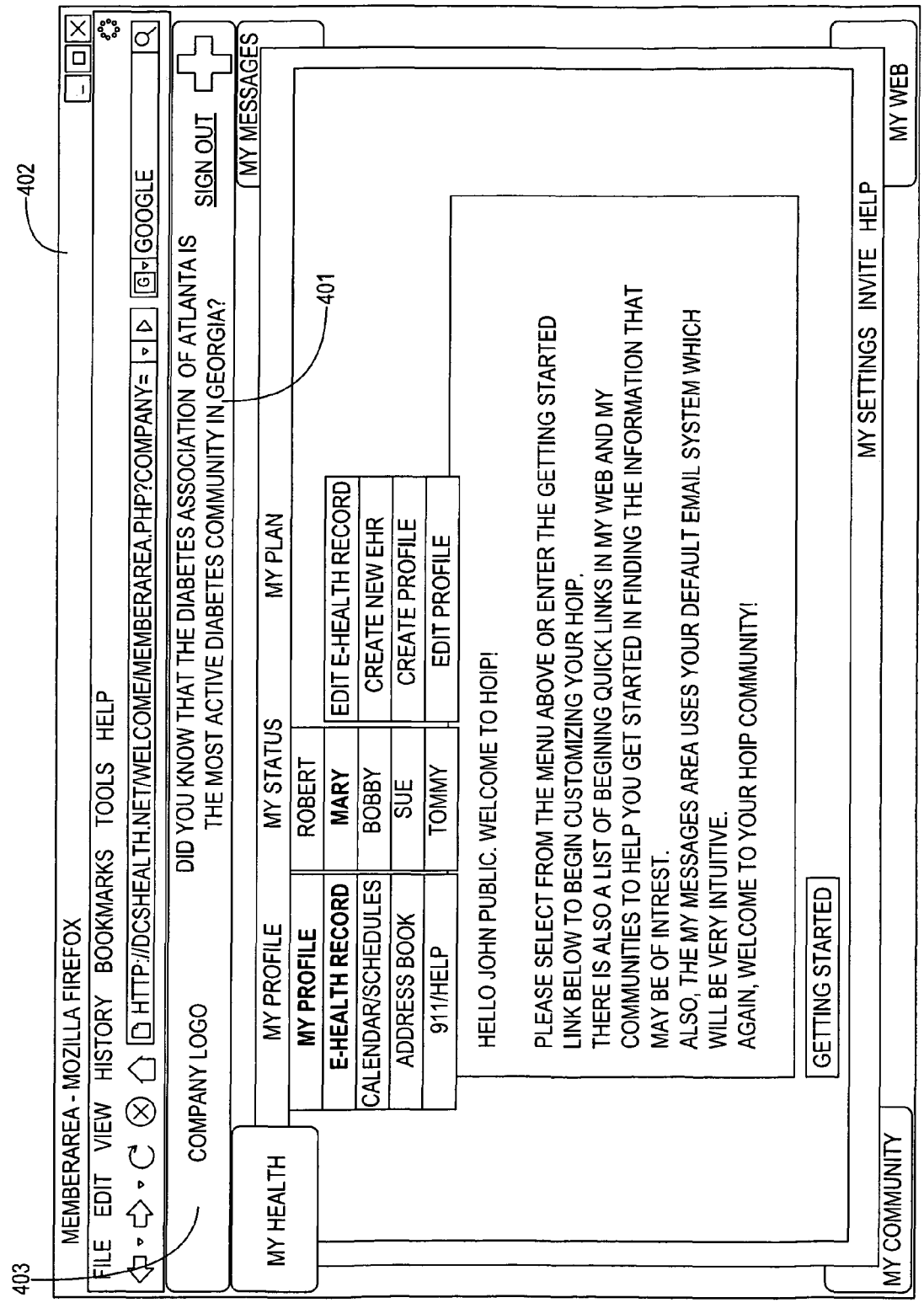
Figure 4F:
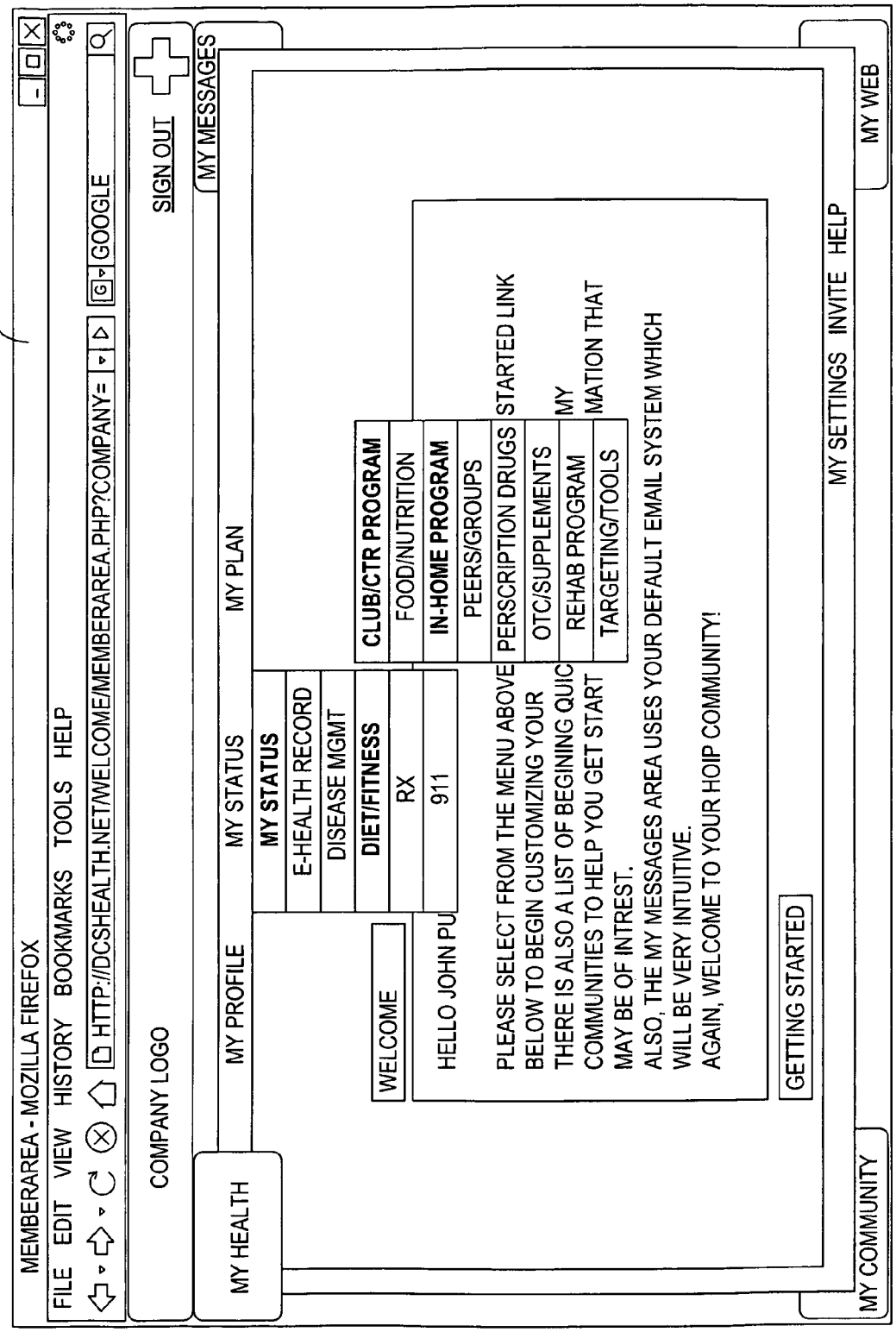
Figure 4G:
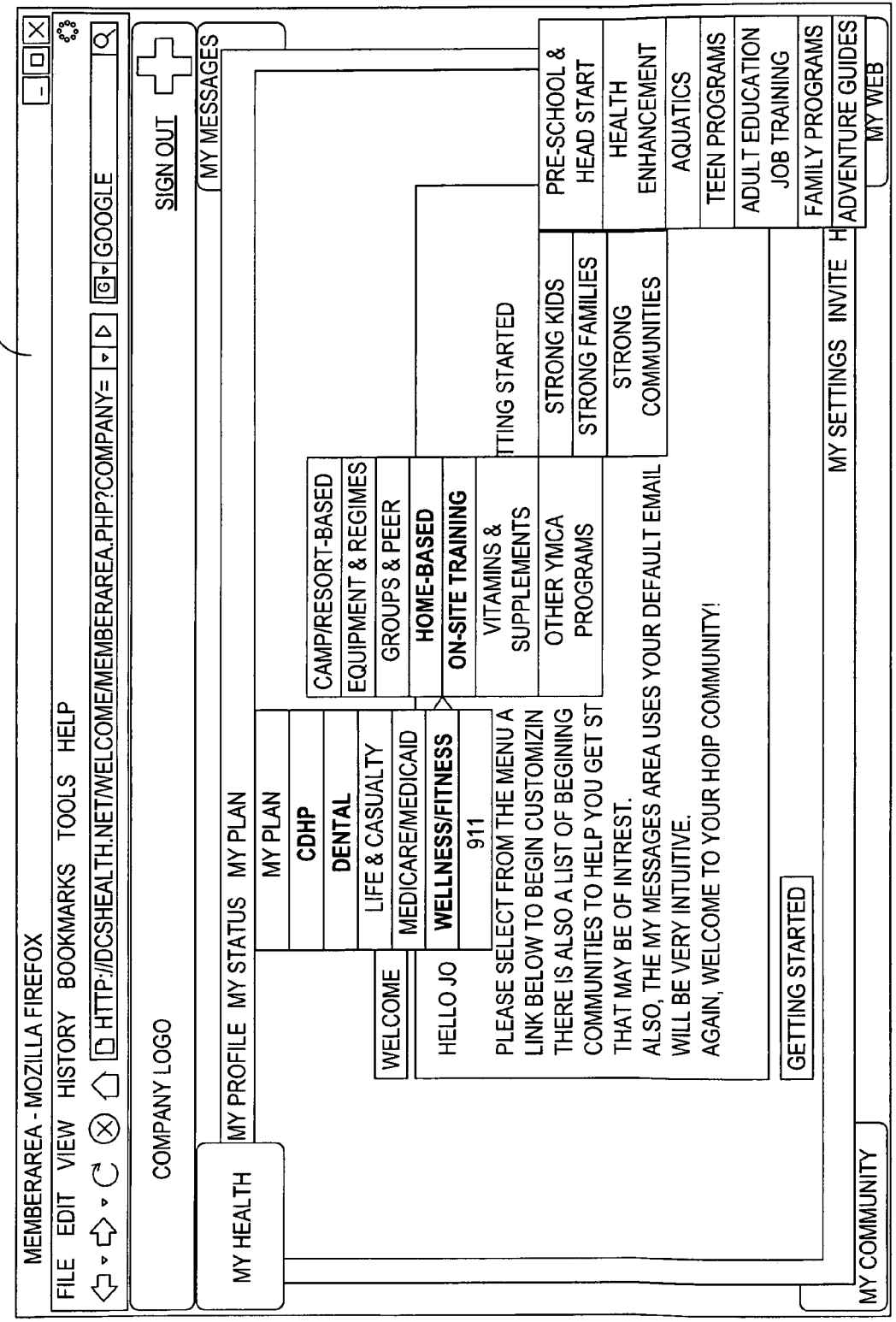
Figure 4H:
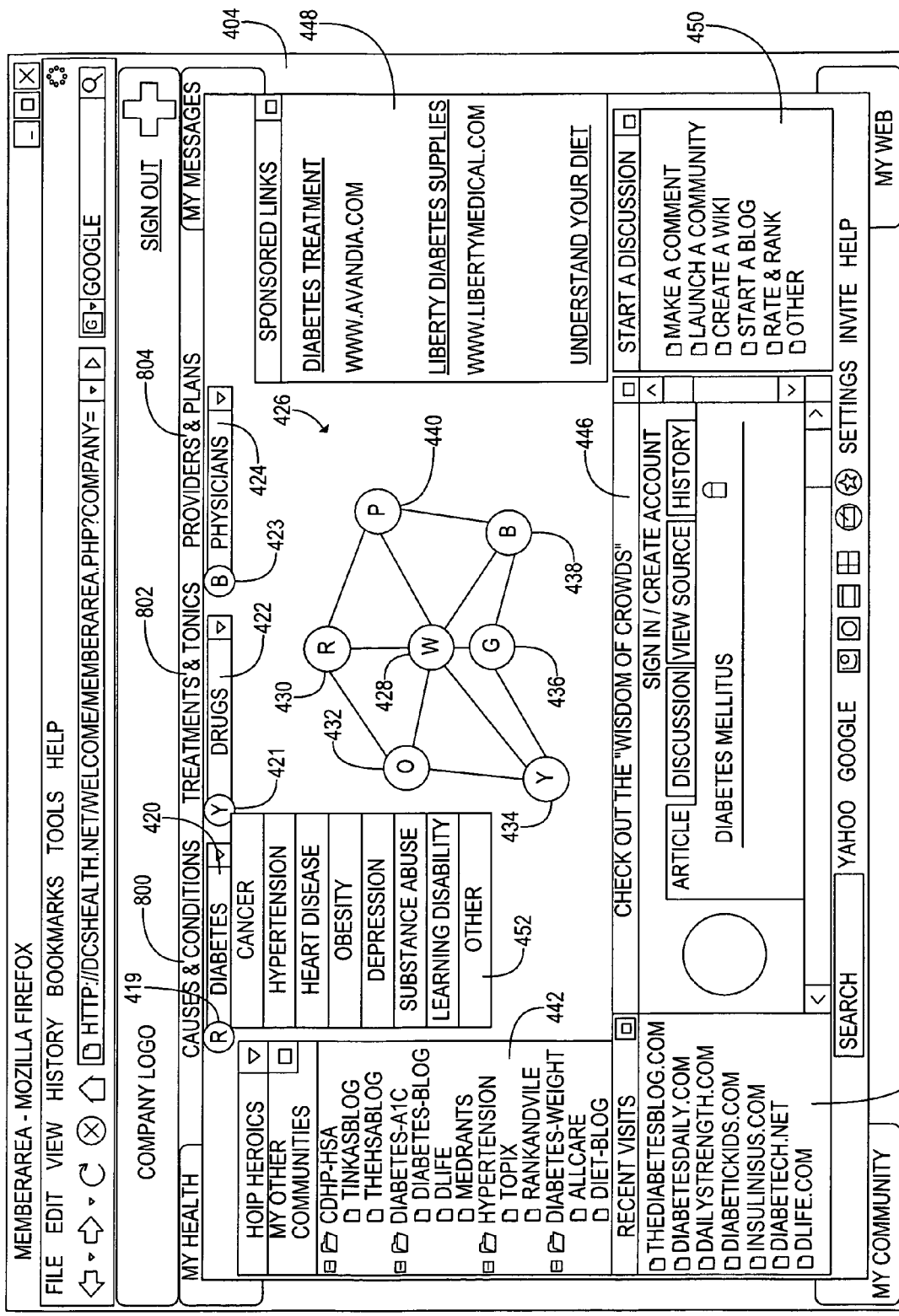
Figure 4I:
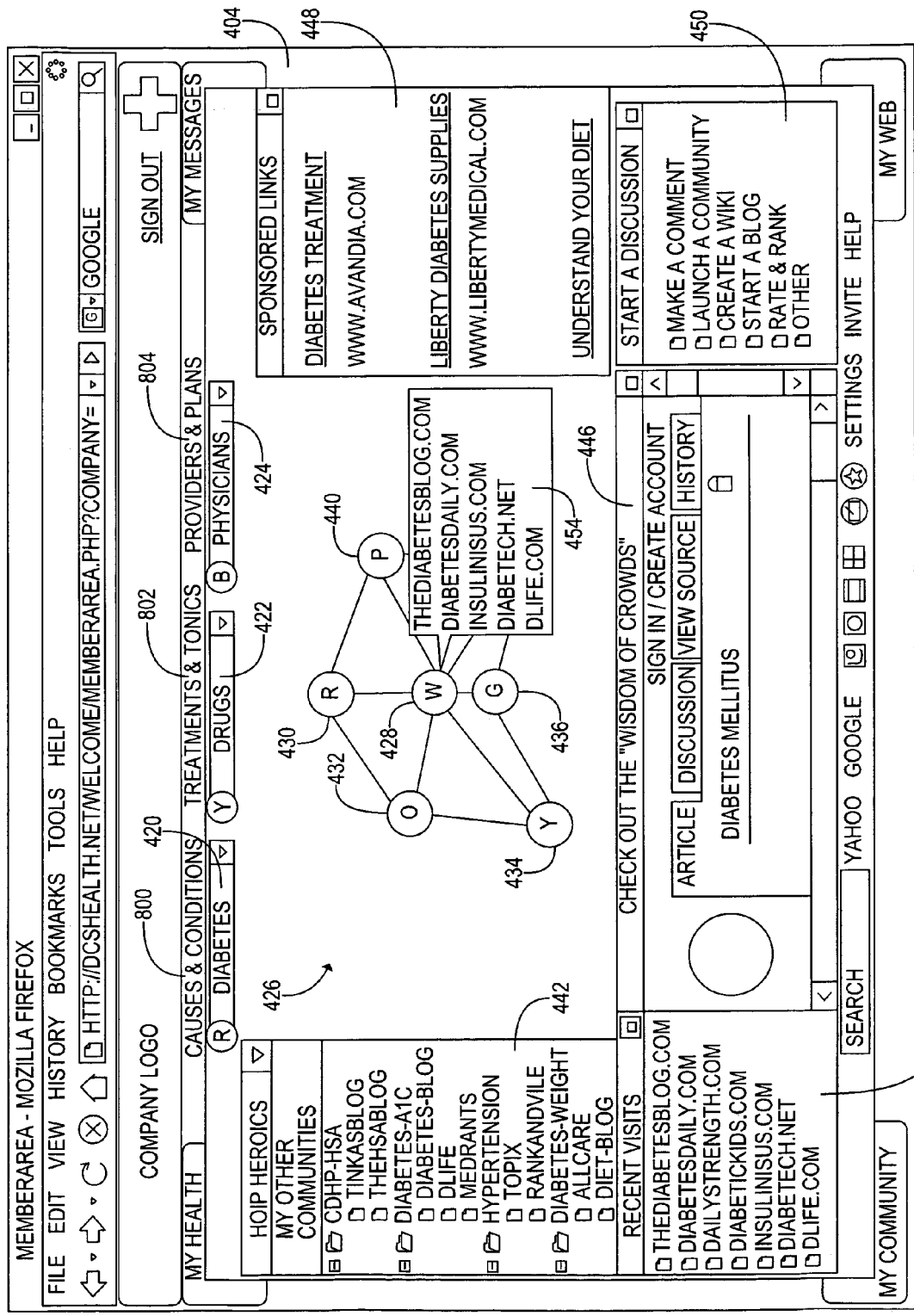
Figure 4J:
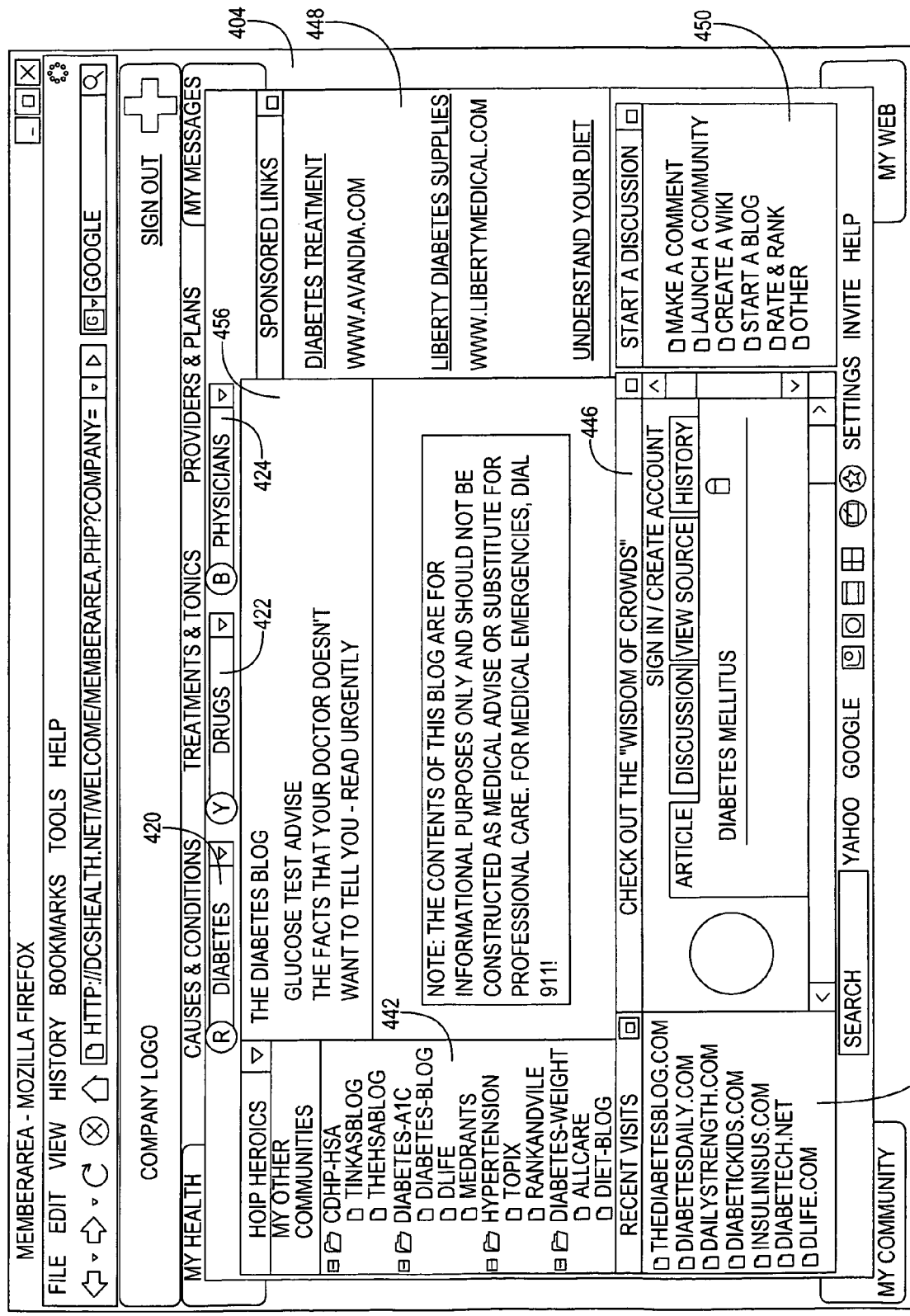
Figure 4K:
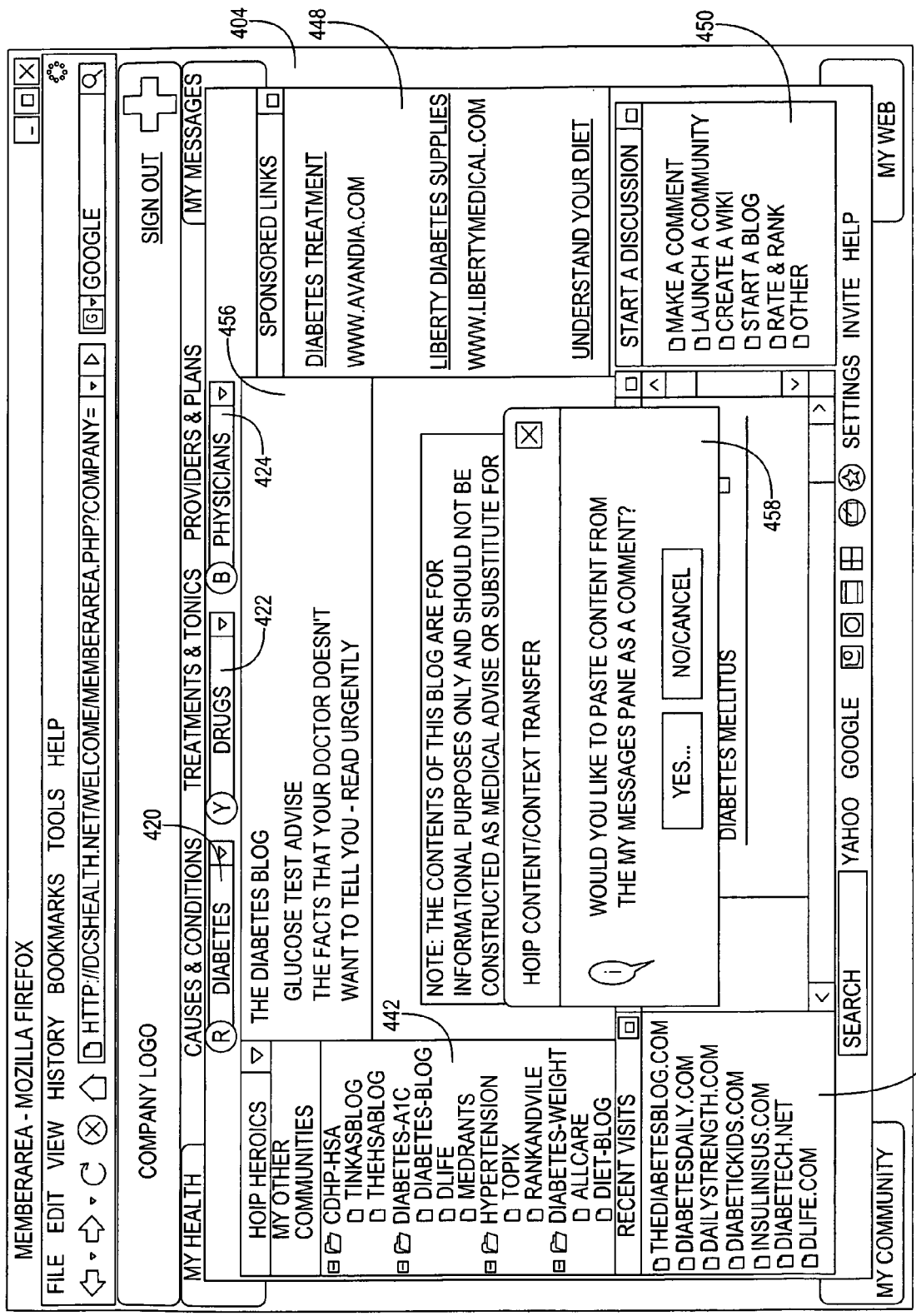
Figure 4L:
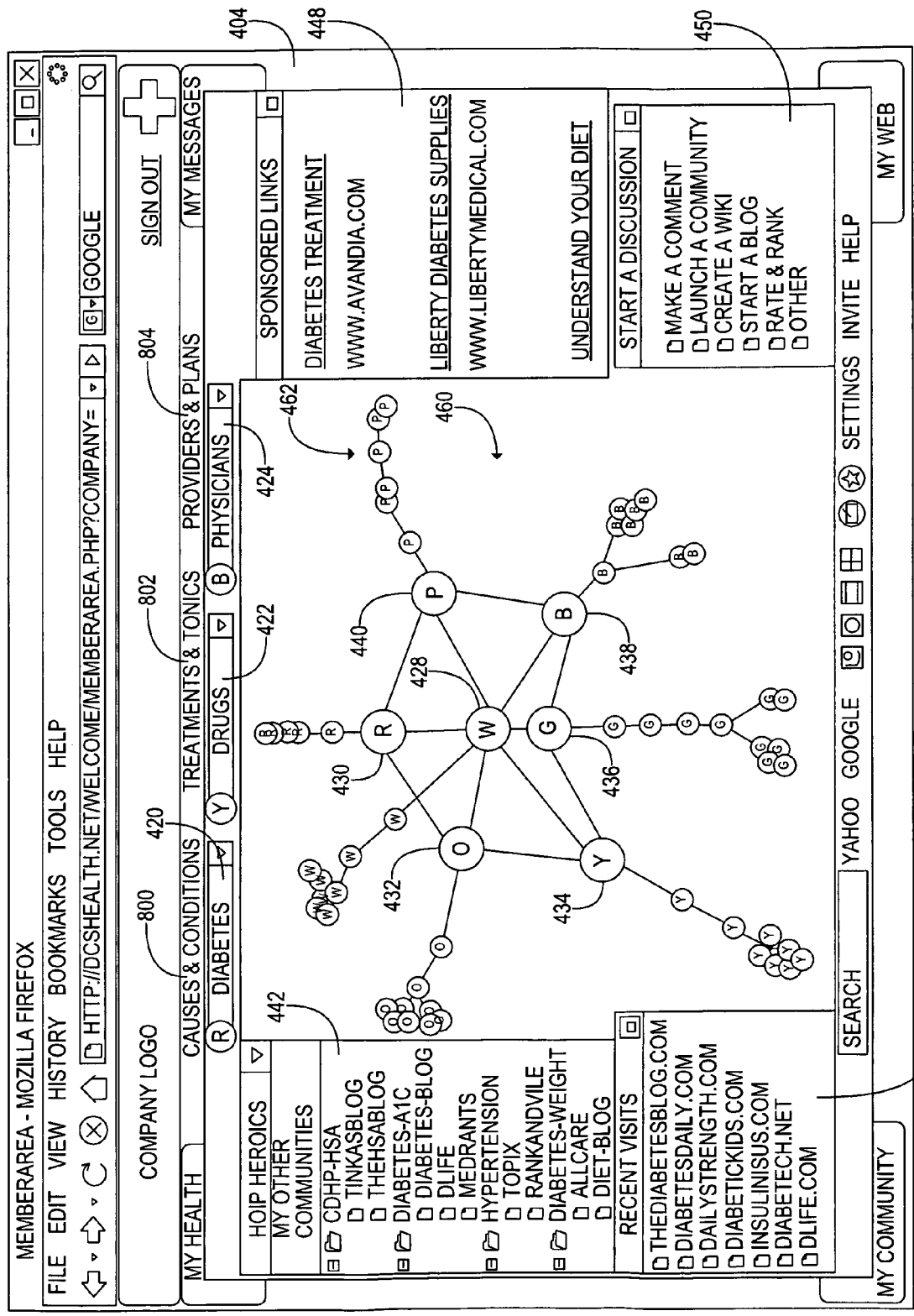
Figure 4M:
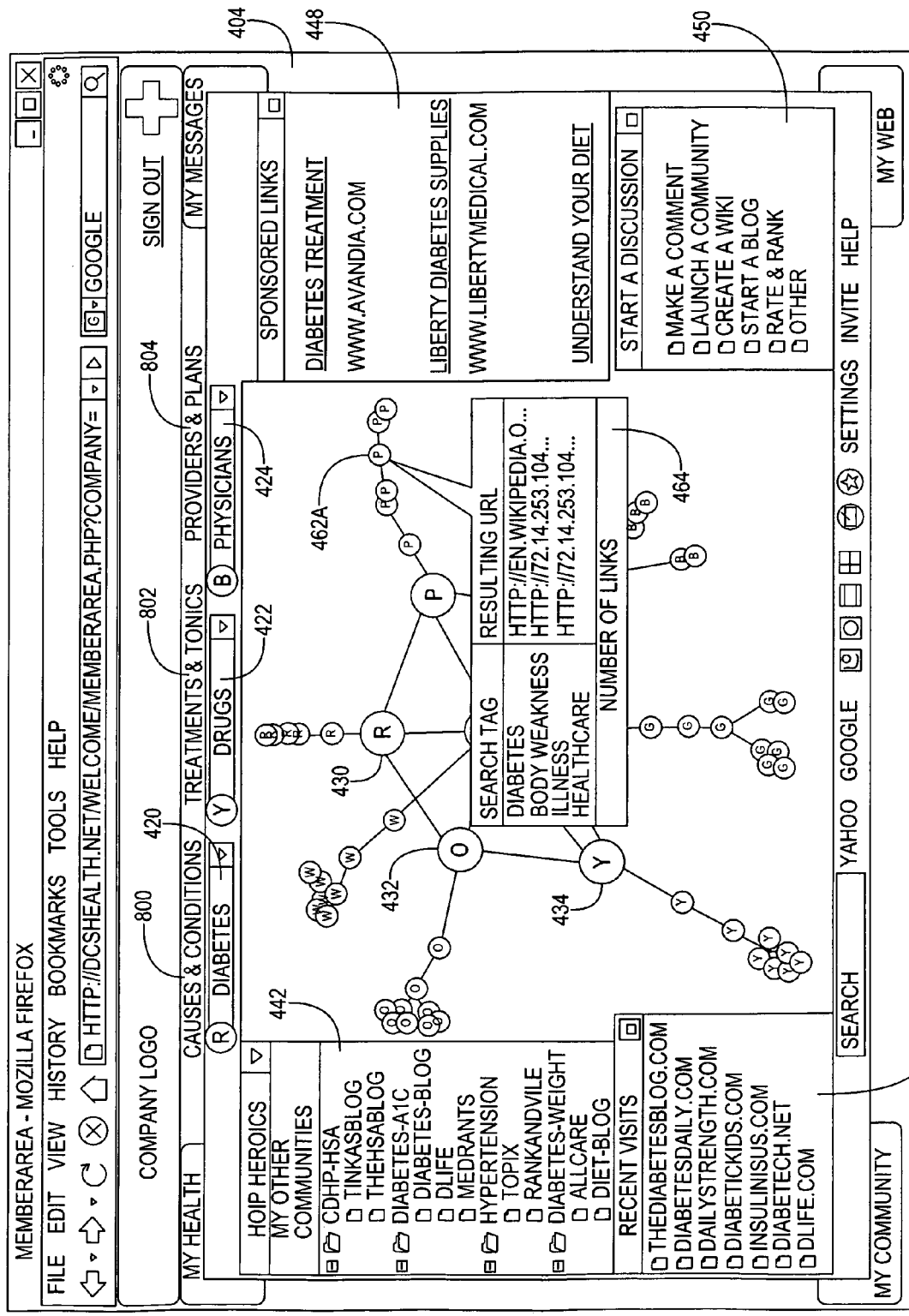
Figure 4N:
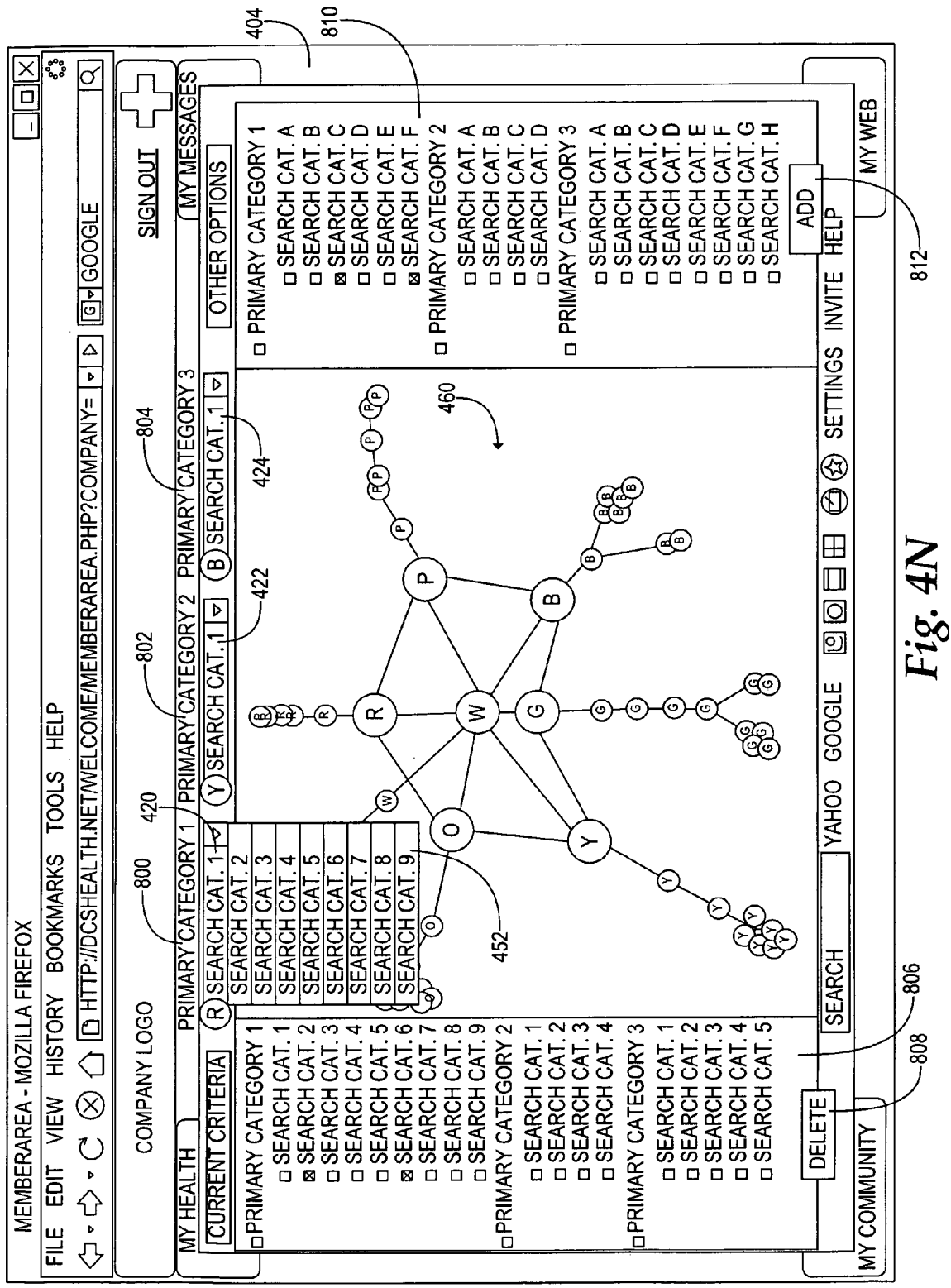
Figure 40:
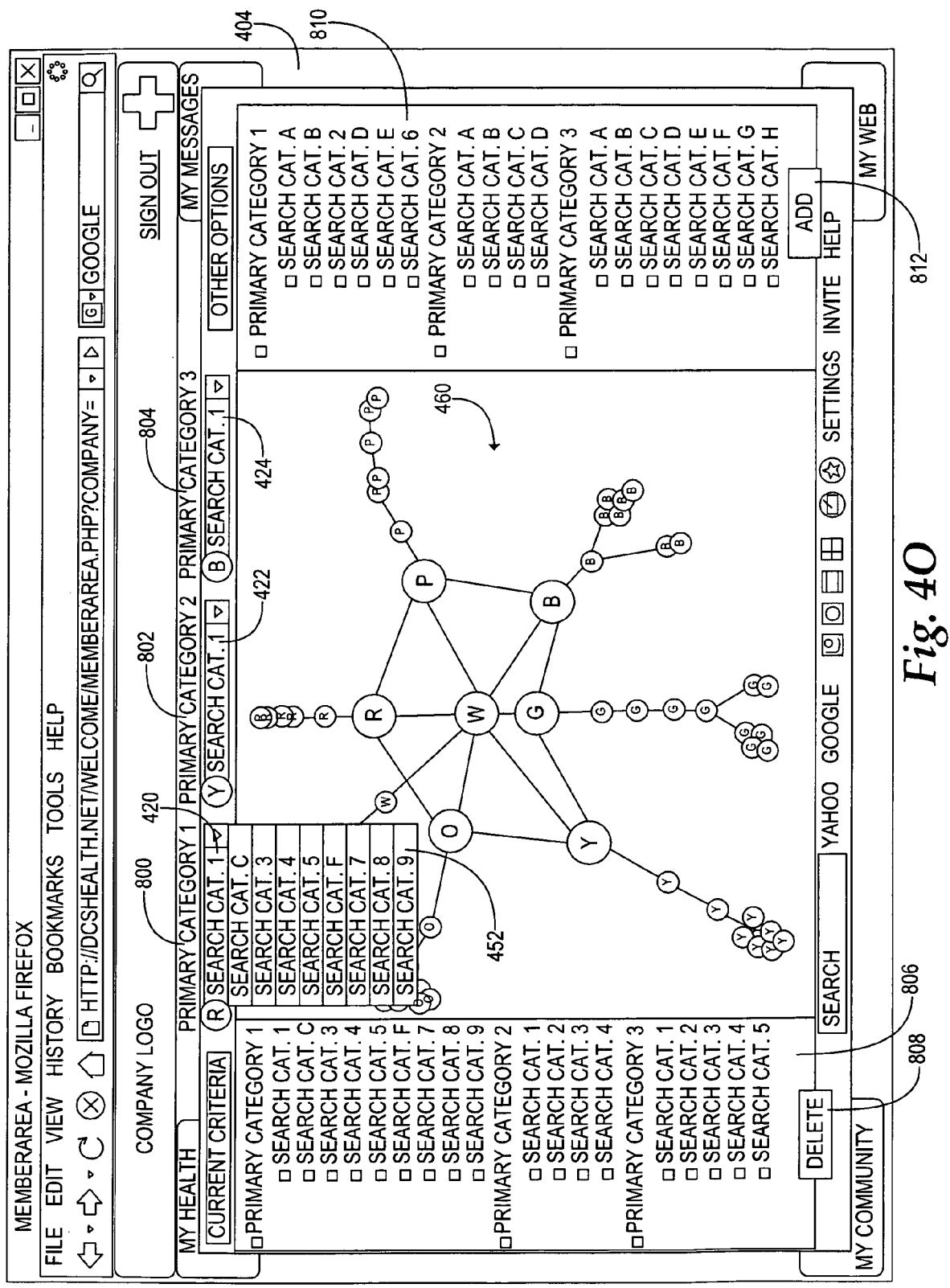
Figure 4P:
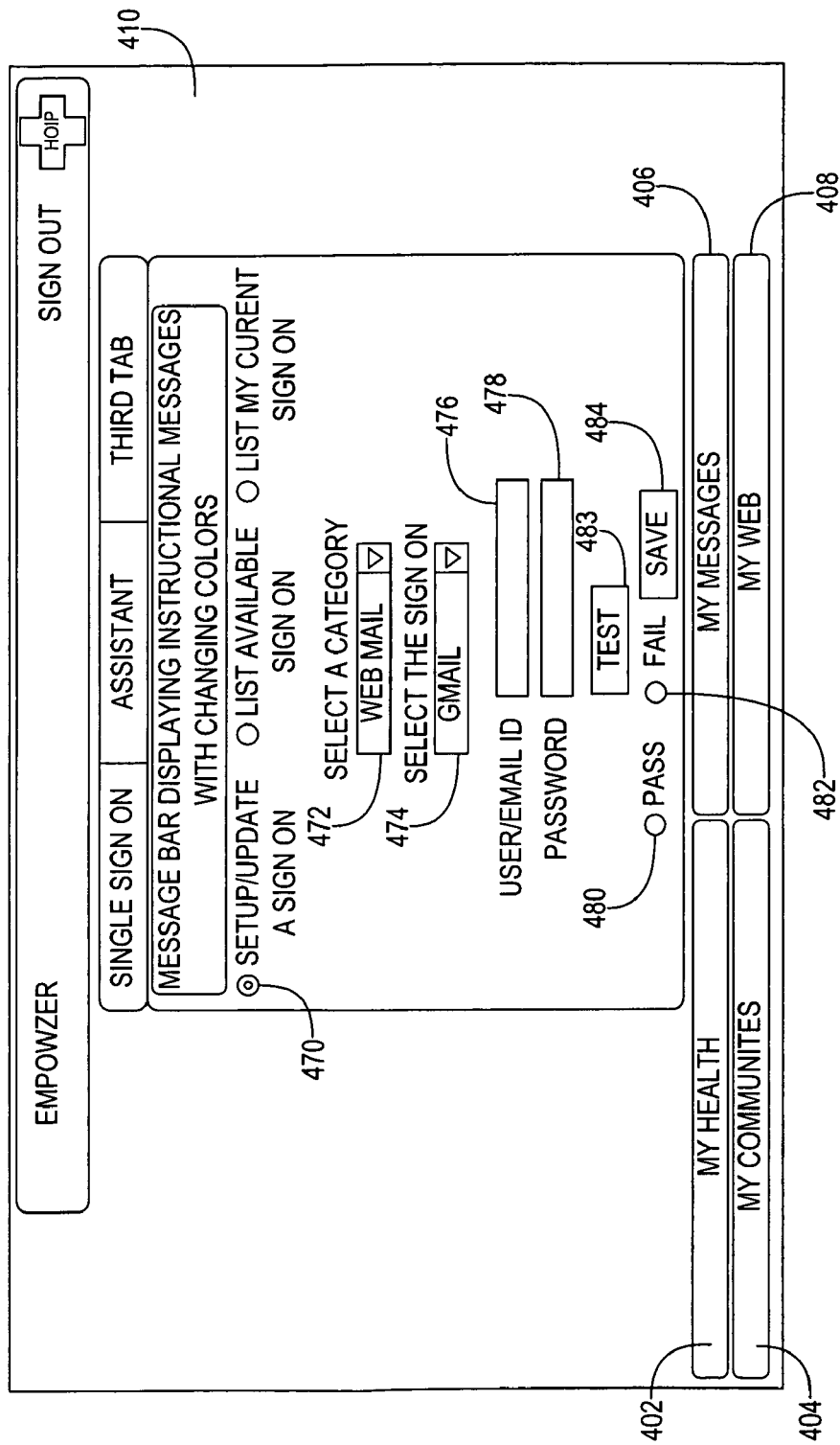
Figure 4Q:
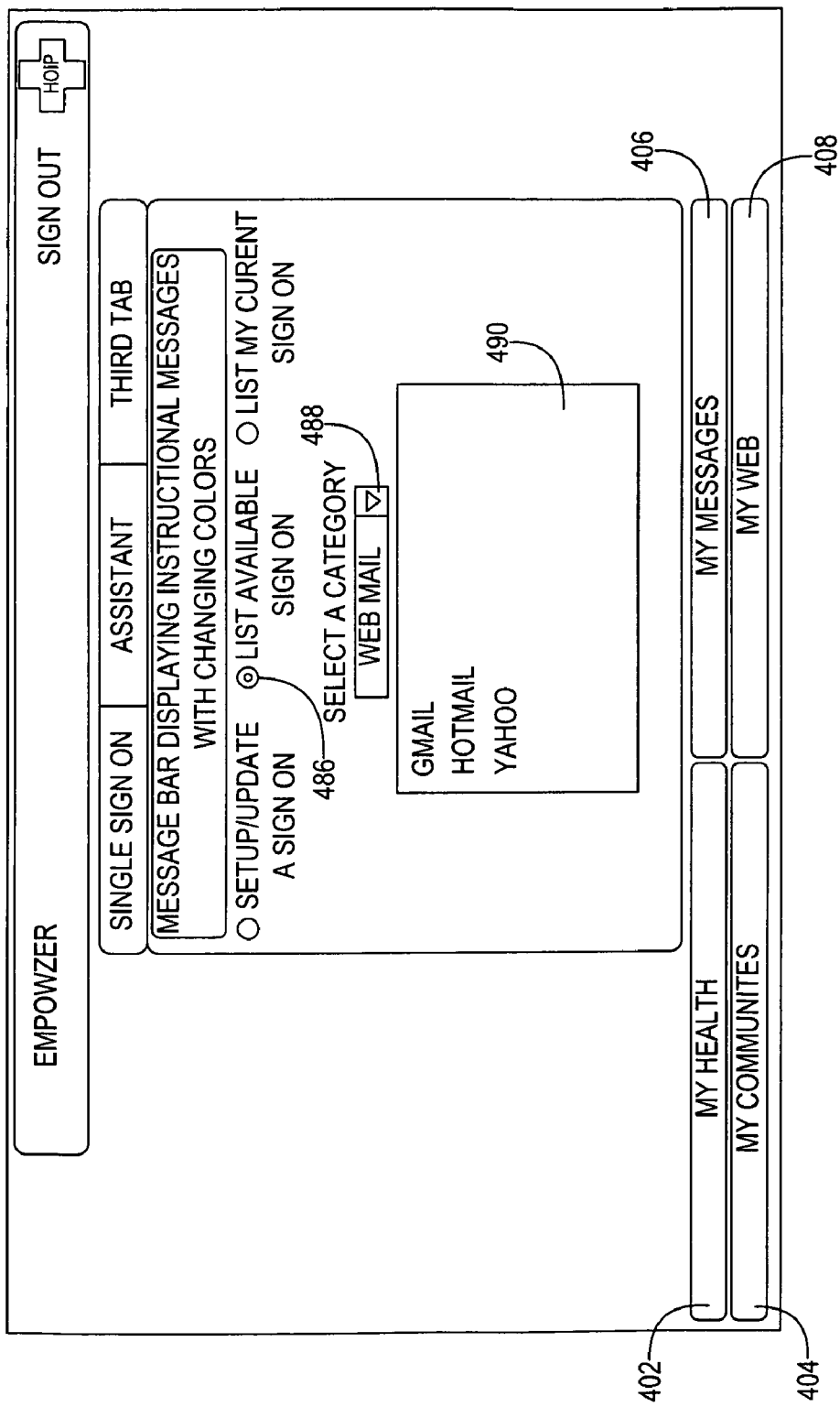
Figure 4R:
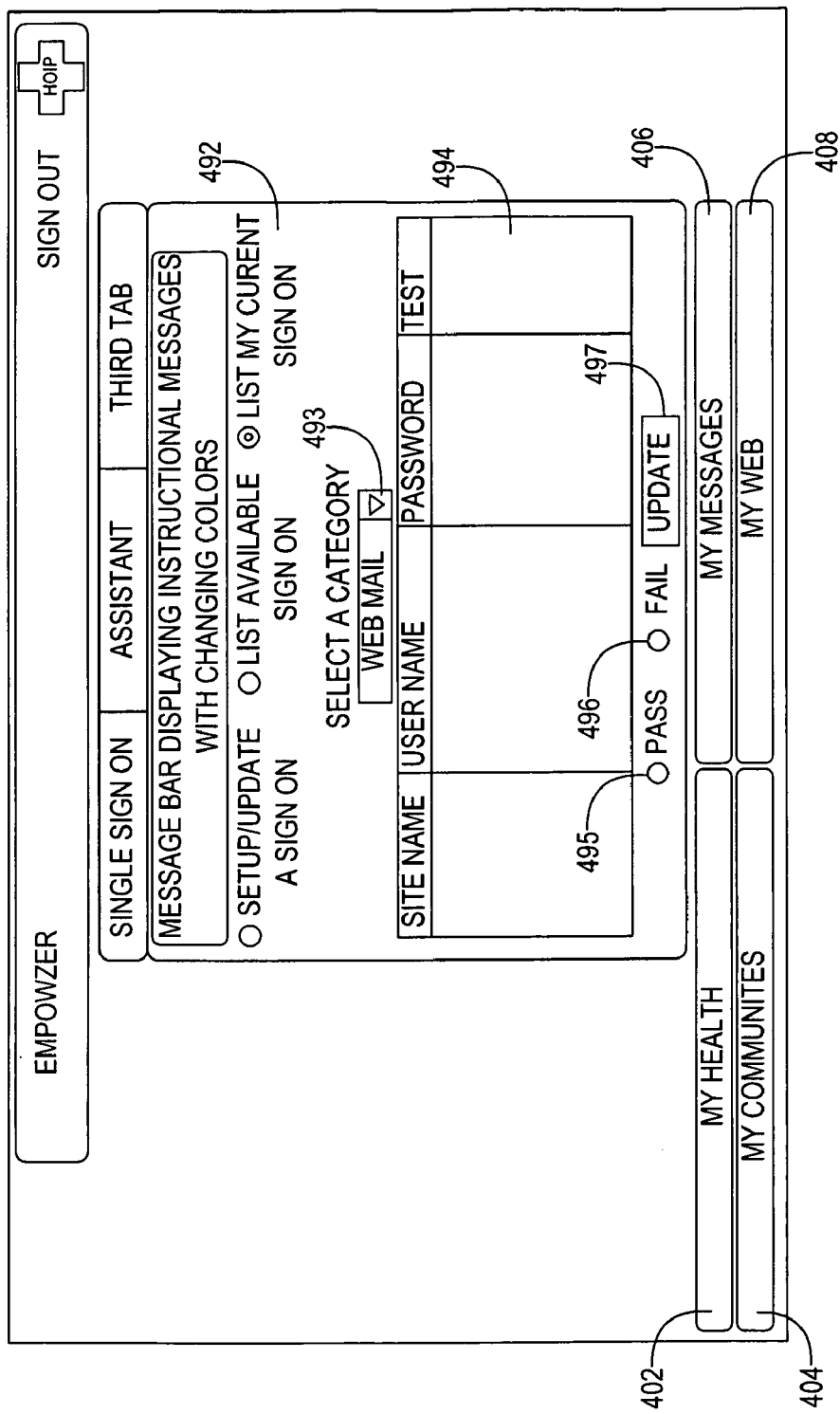

In addition, when a user requests access to the multi-view interface 114, single sign on functionality may be provided by the interface to allow the user to sign in to all web services, such as web mail, communities, and medical websites, that are integrated with the interface, as discussed further with regard to FIGS. 4P-4R. The websites and applications from which information is provided via the multi-view interface 114 as well as the taxonomy provided via the multi-view interface may depend on the user requesting access to the interface. The user may be requested to provide a username and password to access the multi-view interface 114 which the interface framework server module 244 compares to customer data, such as identification information, to determine which websites and applications to initially contact to provide information to the windows of the multi-view interface and which taxonomy to provide via the interface. It should be appreciated by those skilled in the art that the functionality of the interface framework client module 224 of the user device 102 described herein and the functionality of the interface framework server module 244 of the multi-view interface server computer 106 described herein may be distributed between the user device and the multi-view interface server computer as needed to provide the multi-view interface 114 to a user requesting access.

The mass storage device 238 may also be operative to store and execute one or more customer applications 240. The customer applications 240 may include customer relationship management applications for collecting and using detailed information regarding a user such as, identification information, spending patterns, and interests, to more specifically tailor correspondence to the customer. The customer applications 240 may also include affinity applications for providing discounts and benefits to a user based on detailed information regarding the user. Further, the customer applications 240 may include an introductory help guide application which provides the user with helpful tips and hints about functions provided by the multi-view interface 114 while the user is navigating the multi-view interface. Moreover, the customer applications 240 may include any suitable customer application. According to further embodiments, the customer applications 240 may be provided by third parties, such as via the servers 112a-112n, to the media engine 246 through the network 104, as illustrated in FIG. 2B.

The mass storage device 238 is also operative to store and execute a community search application 242 which may receive user search input provided in the community window of the multi-view interface 114 and search the database 108 for links associated with content provided by servers, such as the servers 112a-112n, that is relevant to the received user search input. The user search input may be selected from a plurality of categories provided by the taxonomy, as further described in view of FIGS. 4H-4O. According to exemplary embodiments, the database 108 includes addresses, such as Universal Resource Locators (URLs), to content provided by the servers 112a-112n over the network 104 that is relevant to the received user search input. The addresses stored in the database 108 may be associated with tags that correspond to the taxonomy provided via the multi-view interface 114 such that user search input received via the multi-view interface may be compared with the tags to determine addresses from the database 108 that are relevant to the user search input and should be provided in response to the user search input. To initially and continually build the list of addresses stored in the database 108, the community search application 242 and/or individuals may use the categories of the taxonomy associated with the multi-view interface 114 to search the network 104 for content provided by the servers 112a-112n that is relevant to the taxonomy categories. The resulting content may then be reviewed and associated with tags that are relevant to the taxonomy categories and that accurately describe the resulting content. As further described in view of FIGS. 6A-6B, links to content provided by the servers 112a-112n and the associated tags may be stored in the database 108 and searched by the community search application 242 to provide the links relevant to the received user search input to the multi-view interface 114. According to further embodiments, the community search application 242 directly searches the servers 112a-112n utilizing one or more existing search engines such as, for example, GOOGLE search engine, YAHOO search engine, and DIGG search engine, to find communities relevant to the user search input in response to receiving the user search input via the multi-view interface 114. Communities may include any blog, vlog, forum, or other social networking environment accessible via the network 104.

According to exemplary embodiments, when the community search application 242 receives taxonomy categories or taxonomy categories selected as user search input provided at the community window, the community search application enhances the taxonomy categories/user search input by associating additional keywords with the taxonomy categories/search input provided by the user such that a more direct and specialized search of content provided by network resources such as the servers 112a-112n and/or of links stored in the database 108 is performed. The additional keywords associated with user search input received at the community window may be determined based on business rules provided by the inference engine 300, as discussed further below. According to exemplary embodiments, the business rules may focus on disease management such that user search input received in the community window is enhanced with keywords directed to disease management such that communities relevant to disease management and the user input are provided. The additional keywords associated with user search input received at the community window may also be determined based on the particular existing search engine to be used to find community content associated with the enhanced search input. The community search application 242 may use the enhanced search input to search the database 108 and/or the servers 112a-112n associated with the network 104 for relevant communities and provide links to the resulting relevant communities.

The mass storage device 238 of the multi-view interface server computer 106 may also store and execute the media engine 246. Alternatively, the media engine 246 may be in direct communication with the multi-view interface server computer 106 or in communication via the network 104. According to exemplary embodiments, the media engine 246 includes the inference engine 300 and a taxonomy engine 310 described further in reference to FIG. 3. The inference engine 300 may receive an identification code string from the user device 102, and process the interactions associated with the identification code string to determine an anticipated next interaction or action by the user. The inference engine 300 may provide content to the user via the multi-view interface 114 congruent with the determined anticipated next interaction by the user. For example, if a user selects a status window of the multi-view interface 114 and then selects the messaging window to send an email to his/her doctor, then the inference engine 300 may determine that the user is likely suffering a medical episode, such as a drop in glucose level in diabetic patients, and content to help alleviate the episode should be provided such as, but not limited to, an advertisement for insulin. As noted above, although the example is described in terms associated with disease management, exemplary embodiments may be used with any service or information.

It should be appreciated by those skilled in the art that all or a portion of the customer applications 240, the community search application 242, the interface framework server module 244, the media engine 246, the client-side monitor module 222, and the interface framework client module 224 can be hosted and delivered via a network-based server, such as the multi-view interface server computer 106, such that the web browser application 220 of the user device 102 is the client; can be implemented as a downloadable client to the user device 102; or can be implemented via a combination thereof.

Figure 3:
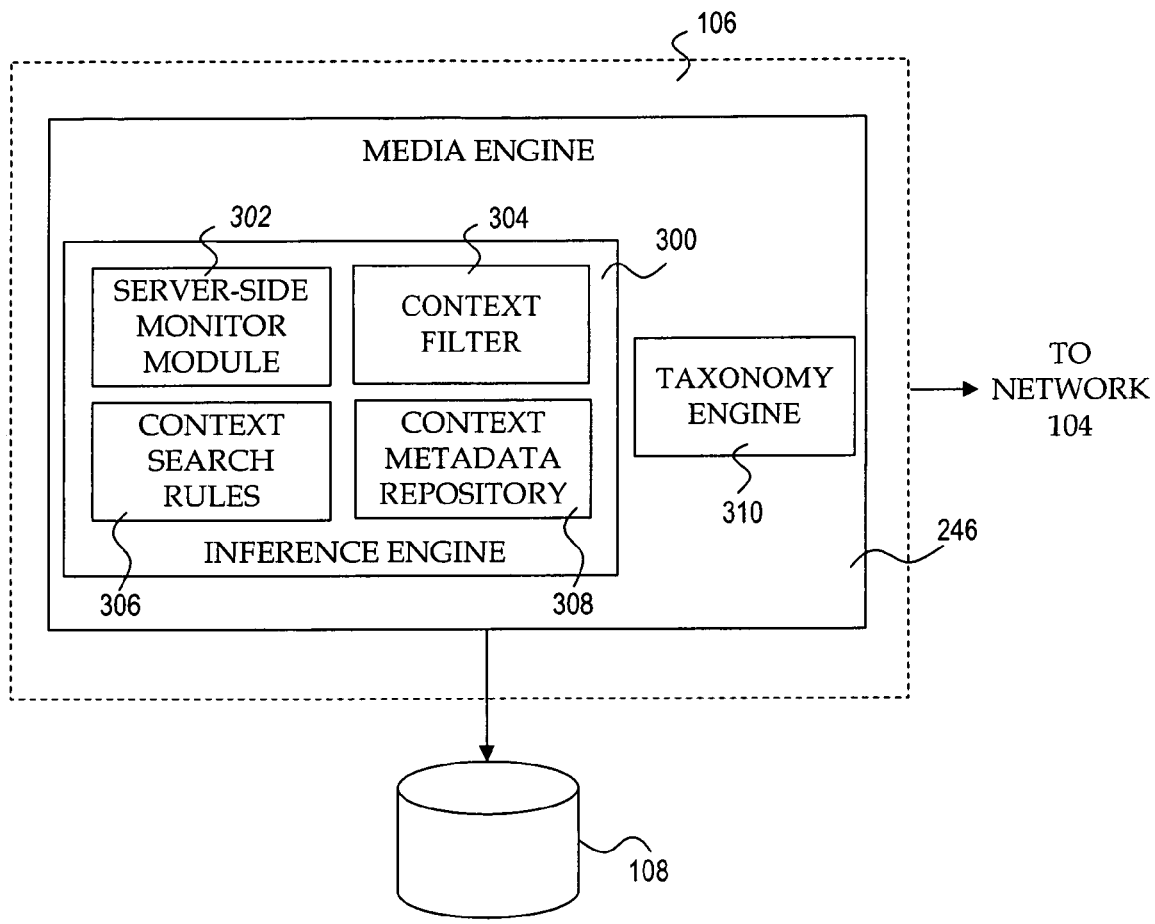
FIG. 3 is a block diagram illustrating a media engine for providing and managing a multi-view interface according to exemplary embodiments.

FIG. 3 illustrates an exemplary embodiment of the media engine 246 of the multi-view interface server computer 106. As noted above, the media engine 246 may include the inference engine 300 and the taxonomy engine 310. The inference engine 300 may include the server-side monitor module 302, a context filter 304, context search rules 306, and a context metadata repository 308. According to exemplary embodiments, the server-side monitor module 302 monitors tangible interactions or actions performed by a user while interacting with the multi-view interface 114. The tangible interactions with the interface 114 may include, but are not limited to, sending an email message, sending an instant message, issuing an insurance claim, marking a URL as a favorite, supplying biometrics, or any other actions which change persistent data. The server-side monitor module 302 may also monitor information being provided to a user through one or more of the multiple panes of the multi-view interface 114 and/or through other locations within the browser instance by scanning the information provided to the user. For example, the server-side monitir module 302 may monitor content of an electronic message received via a web-based electronic mail service associated with a messaging window of the multi-view interface 114. Once the server-side monitor module 302 receives the identification code string from the client-side monitor module 222, the server-side monitor module may decode the string to determine the corresponding navigational interactions and combine the navigational interactions with tangible interactions of the user monitored by the server-side monitor module, with monitored information provided to the user, with business rules provided by the inference engine 300, and with user profile information stored in the database 108 to anticipate the next action that the user will perform so that the inference engine can direct content from the content servers 112a-112n and/or the database 108 associated with the anticipated next action to the user via the multi-view interface 114. It should be appreciated by those skilled in the art that the functionality of the client-side monitor module 222 of the user device 102 described herein and the functionality of the server-side monitor module 302 of the multi-view interface server computer 106 described herein may be distributed between the user device and the multi-view interface server computer as needed to determine further web-based information to provide to the user through one or more of the multiple panes of the multi-view interface 114 and/or other locations within the browser instance.

According to exemplary embodiments, the context filter 304 and the context search rules 306 of the inference engine 300 include the business rules and expert logic that are combined with the monitored interactions of a user to anticipate the user's next action. The business rules and expert logic may include information based on the focus of the multi-view interface 114. For example, if the multi-view interface 114 is directed to disease management, then the business rules and expert logic may include health and disease-focused information. On the other hand, if the multi-view interface 114 is directed to travel services, then the business rules and expert logic may include vacation and entertainment-focused information. Although the multi-view interface 114 described herein is focused on disease management, it should be appreciated by those skilled in the art that the multi-view interface may be directed to any subject type.

As discussed above, the community search application 242 may enhance a taxonomy category selected as user search input or a received taxonomy category by associating additional keywords with the search input/taxonomy category provided by the user such that a more direct and specialized search for content provided by the servers 112a-112n is performed. According to exemplary embodiments, the context metadata repository 308 provides the business rules used to determine the additional keywords to enhance the user search input/taxonomy categories. The business rules provided by the context metadata repository 308 may focus on disease management such that user search input received in the community window is enhanced with keywords directed to disease management such that communities relevant to disease management and the users input are provided. It should be appreciated by those skilled in the art that the business rules may be directed to any subject type based on the focus of the multi-view interface.

According to exemplary embodiments, the taxonomy engine 310 determines how information provided by the content servers 112a-112n, content provided by the multi-view interface server computer 106, and the taxonomy provided by the multi-view interface 114 is arranged and presented to a user via the panes of the interface. The taxonomy engine 310 may receive information from the inference engine 300, such as a user's anticipated next interaction, as well as the business rules provided by the context filter 304 and the context search rules 306 of the inference engine 300 and based on the received information, may arrange information being provided to the multi-view interface 114 to help influence the user's interaction with the interface as well as to assist the user with interacting with the interface. The taxonomy engine 310 may also receive user interaction information from the inference engine 300 as well as input made by a user via the multi-view interface 114 to determine which categories of the taxonomy and the arrangement of the taxonomy categories to be provided by the interface when the interface is requested.

Referring now to FIGS. 4A-4R, exemplary embodiments of the multi-view interface 114 will be described. As illustrated by FIGS. 4A-4B, the multi-view interface 114 may include a My Health window 402, a My Messages window 406, a My Community window 404, a My Web window 408, and a My Settings window 410. As discussed above, when the multi-view interface server computer 106 receives the request from the user device 102 to initiate the multi-view interface 114, such as by receiving login information from the user in login fields 412, the interface framework server module 244 contacts the appropriate URLs associated with one or more of the windows of the multi-view interface and connects the user device 102 with the corresponding websites and/or applications provided by server computers, such as the server computers 112a-112n, such that information provided by the corresponding websites and applications is displayed via the windows of the interface and/or other locations within the browser instance. The interface framework server module 244 also accesses the database 108 to retrieve the taxonomy associated with the received login information to be provided by the multi-view interface 114. Moreover, according to exemplary embodiments, when the user logs in to initiate the multi-view interface 114, the interface framework server module 244 may also send appropriate sign on information, such as usernames and passwords, to corresponding websites and web services integrated with the interface such that the user is automatically signed in to the websites and web services via the single sign on to the multi-view interface. The interface framework server module 244 may support a variety of sign on formats including custom API sign on, SOAP sign on, HTTP sign on, and JAVASCRIPT sign on. As will be further illustrated in FIGS. 4C-4H and 4P, when one of the windows 402, 404, 406, 408, or 410 is selected, the display of the multi-view interface 114 changes to bring focus on the selected window while continuing to provide access to the remaining non-selected windows. Although the multi-view interface 114 discussed herein is illustrated with five windows which come in and out of focus depending on the window selected, it should be appreciated that the interface may include any number of windows arranged in any format and displayed in any format when selected.

As illustrated in FIG. 4C, the My Web window 408 may provide a search input area for providing terms for searching servers, such as the servers 112a-112n, associated with the network 104, such as the Internet. The My Web window 408 may include taxonomy categories such as a list of the user's favorite URLs, blogs, RSS feeds, and consumer directed health plan (CDHP) feeds which provide the user with quick access to the websites corresponding to the list. As illustrated in FIG. 4C, a user may add or delete links to URLs, blogs, RSS feeds, and CDHP feeds using the My Web window 408. When one of the links is selected or a particular URL is provided, the My Web window 408 displays the corresponding website and information provided by the associated server, such as the server 112a, according to exemplary embodiments. The My Web window 408 may also include categories relevant to a user and links of websites associated with the categories. The My Messages window 406 illustrated in FIG. 4D may be used for sending and receiving electronic mail and messages. The My Messages window 406 may provide access to any web-enabled electronic mail service and/or Instant Messaging interface.

FIGS. 4E-4G illustrate exemplary embodiments of the My Health window 402. The My Health window 402 may provide access to information associated with the user accessing the multi-view interface 114 via a My Profile category, a My Status category, and a My Plan category. The information may include data stored in the database 108 and/or web content provided by the servers 112a-112n. In accordance with the disease management example described herein, the My Profile category may provide additional taxonomy options via, for example, a drop down menu allowing the user to access health profile information associated with the user, a calendar or schedule of tasks associated with the user, an address book associated with the user, and emergency contact information associated with the user. As illustrated in FIG. 4E, the taxonomy options of the My Profile category may provide additional taxonomy categories via, for example, further drop down menus to allow the user to create and modify information provided by the My Profile category. According to exemplary embodiments, taxonomy categories provided by the multi-view interface 114 are highlighted, as indicated by the bold categories illustrated in FIGS. 4E-4G, to specify those categories for which the user has previously interacted with based on interaction information from the inference engine 300 and/or for which the user has some association based on, for example, profile information about the user stored in the database 108.

The My Status category of the My Health window 402 may provide health status information associated with the user. For example, as illustrated in FIG. 4F, the My Status category provides further taxonomy categories allowing the user to access status information associated with health records of the user, status information associated with disease management utilized by the user, status information associated with diet/fitness programs utilized by the user, and information associated with prescriptions utilized by the user. As illustrated in FIG. 4G, the My Plan category of the My Health window 402 may provide access to information regarding health plan options and health program options which allows a user to monitor current health plans and programs as well as to learn about and select appropriate health plan options and programs. Although the taxonomy options provided by the My Health window 402 as described herein are associated with disease management, it should be appreciated that the options can be associated with any type of service or information.

As discussed above, the inference engine 300 may combine user interactions with the multi-view interface 114 monitored by the client-side monitor module 222 and the server-side monitor module 302, with monitored information provided to the user, with business rules provided by the inference engine, and with user profile information stored in the database 108 to anticipate the next action that the user will perform so that the inference engine can direct content from the content servers 112a-112n and/or the database associated with the anticipated next action to the user via the multi-view interface. The content directed to the user via the content servers 112a-112n and/or the database 108 may be displayed in a location associated with any of the panes of the multi-view interface 114 or any other location associated with the interface. For example, as illustrated in FIG. 4E, the My Health window 402 may include an advocacy section 401 for receiving content directed to the user by the inference engine 300 based on monitored user interactions with the multi-view interface 114, monitored information provided to the user via the interface, business rules, and user profile information. Additionally, the My Health window 402 may also include a logo section 403 for displaying the logo or brand of a customer providing access to the multi-view interface 114.

The My Community window 404 of FIG. 4H provides an interface for receiving and interacting with communities such as blogs, vlogs, and forums relevant to requests received at the My Community window. The My Community window 404 may also include a list of a user's favorite communities 442 along with links to access the communities categorized based on the main topics of the communities. According to exemplary embodiments and as discussed above, the My Community window 404 also provides links to suggested communities located based on enhanced search input provided by the community search application 242. When the community search application 242 receives user search input provided at the My Community window 404, the community search application 242 enhances the user search input by associating additional keywords with the search input provided by the user such that a more direct and specialized search of community links stored in the database 108 and/or content provided by the servers 112a-112b is performed. In accordance with exemplary embodiments, the user provides search input based on a number of primary categories associated with a particular business vertical which together ultimately define the services and/or products provided by the business vertical and from which the remaining hierarchy of categories associated with the business vertical is generated. The example business vertical described herein is disease management, and the number of primary categories associated with disease management includes three primary categories which may be a causes and conditions category 800, a treatments and tonics category 802, and a providers and plans category 804. It should be appreciated by those skilled in the art that any number of primary categories associated with any business vertical may be used to define user search input.

A user may provide search input to the My Community window 404 using taxonomy search categories associated with the three primary categories 800, 802, 804 provided by a causes and conditions drop down menu 420, a treatments and tonics drop down menu 422, and a providers and plans drop down menu 424, respectively. The taxonomy search categories selected as search input at each of the drop down menus 420, 422, and 424 may also be associated with a unique identifier 419, 421, and 423, respectively, which may be used to display the results of the search, as discussed further below. The unique identifiers 419, 421, and 423 may include colors such as red (i.e., indicated by the "R" associated with the identifier 419), yellow (i.e., indicated by the "Y" associated with the identifier 421), and blue (i.e., indicated by the "B" associated with the identifier 423) as illustrated in FIG. 4H; shapes; alphanumeric codes; or any other identifiers capable of uniquely identifying the taxonomy search categories selected as search input.

When a user selects a drop down menu, such as the causes and conditions drop down menu 420, taxonomy search categories 452 may be provided for which the user can select an appropriate cause or condition or enter a particular cause or condition relevant to the user. As noted above, the taxonomy search categories 452 may be customized to the user based on the user's interactions with the categories, any taxonomy modifications provided by the user, as well as any taxonomy modifications provided by a customer for which the user is affiliated. For example, if the user does not see a particular cause under the causes and conditions drop down menu 420 for which the user is interested, the user can select an Other option and provide the name of the particular cause. Accordingly, the provided cause will be added to the taxonomy search categories as a possible search input selection under the causes and conditions drop down menu 420 for use as a search term. As illustrated in FIG. 4H, the taxonomy search categories "diabetes", "drugs", and "physicians" have been selected as the user search input. The additional keywords associated with the taxonomy search categories selected as user search input received at the My Community window 404 to enhance the search input may be determined based on business rules provided by the inference engine 300. Although specific taxonomy search categories to be selected as user search input regarding disease management are illustrated and discussed herein, it should be appreciated by those skilled in the art that the taxonomy search categories provided by the drop down menus 420, 422, and 424 may include input associated with any topic of subject matter. As discussed above, the community search application 242 may use the enhanced taxonomy search categories selected as search input to perform a specialized search of the community links stored in the database 108 to identify and retrieve links associated with content relevant to the enhanced taxonomy categories.

Results of the specialized search may be provided to the user via a list of suggested links and/or a visual display 426 associated with the My Community window 404. According to exemplary embodiments, the visual display 426 illustrates the resulting suggested community links based on the performed specialized search in a manner which demonstrates how relative each suggested community is to the search input; how active and popular each suggested community is based on, for example, the recentness of the latest post and the volume of posts to the community; the relationship between the suggested community links; and the primary category or combination of primary categories for which the resulting suggested community links are related. As illustrated in FIG. 4H, the visual display 426 may include a center core node 428 associated with resulting community links that are determined by the community search application 242 to be the most relevant to the combination of taxonomy categories selected as search input and provided by the menus 420, 422, and 424. To indicate that the center core node 428 is associated with the community links most relevant to the combination of the search input provided by all three of the menus 420, 422, and 424 related to the three primary categories 800, 802, 804, respectively, the center core node may be positioned at or near the center of the visual display 426 and be associated with an indicator, such as a color, shape, or alphanumeric code, illustrating that the community links of the center core node correspond to the combination of the search input of all three of the menus 420, 422, and 424. For example, the center core node 428 may be colored white (i.e., indicated by the "W" associated with the center core node 428) to indicate that the community links associated with the center core node are relevant to the combination of the search input of all three of the menus 420, 422, and 424 (i.e., the red indicator 419, the yellow indicator 421, and the blue indicator 423 of the menus 420, 422, and 424, respectively, combine to make white).

The visual display 426 may include additional core nodes 430, 432, 434, 436, 438, and 440 surrounding the center core node 428. According to exemplary embodiments, the additional core nodes 430, 432, 434, 436, 438, and 440 are associated with resulting community links relevant to further combinations of the taxonomy categories selected as search input and provided by the menus 420, 422, and 424. The additional core nodes 430, 432, 434, 436, 438, and 440 may be spaced around the center core node 428 at varying distances and spaced at varying distances from one another to indicate the degree of relevance between the community links associated with each of the additional core nodes and the community links associated with the center core node as well as the degree of relevance between the community links associated with each of the additional core nodes.

Similar to the center core node 428, the additional core nodes 430, 432, 434, 436, 438, and 440 may be associated with an indicator, such as a color, shape, or alphanumeric code, that illustrates which of the search input of the menus 420, 422, 424 related to the primary categories 800, 802, 804, respectively, that each of the additional core nodes is associated. For example, the additional core node 430 may be colored red (i.e., indicated by the "R" associated with the additional core node 430 in FIGS. 4H-4I and 4L-4O) to indicate that the community links associated with the additional core node 430 are relevant only to the search input selected from the causes and conditions menu 420, in this case diabetes. The additional core node 434 may be colored yellow (i.e., indicated by the "Y" associated with the additional core node 434 in FIGS. 4H-4I and 4L-4O) to indicate that the community links associated with the additional core node 434 are relevant only to the search input selected from the treatments and tonics menu 422, in this case drugs, and the additional core node 438 may be colored blue (i.e., indicated by the "B" associated with the additional core node 438 in FIGS. 4H-4I and 4L-4O) to indicate that the community links associated with the additional core node 438 are relevant only to the search input selected from the providers and plans menu 424, in this case physicians. According to exemplary embodiments, the additional core node 432 is colored orange (i.e., indicated by the "O" associated with the additional core node 432 in FIGS. 4H-4I and 4L-4O) to indicate that the community links associated with the additional core node 432 are relevant only to the combination of search input selected from the causes and conditions menu 420 and the treatments and tonics menu 422 (i.e., the red indicator 419 and the yellow indicator 421 of the menus 420 and 422, respectively, combine to make orange). The additional core node 436 may colored green (i.e., indicated by the "G" associated with the additional core node 436 in FIGS. 4H-4I and 4L-4O) to indicate that the community links associated with the additional core node 436 are relevant only to the combination of search input selected from the treatments and tonics menu 422 and the providers and plans menu 424 (i.e., the yellow indicator 421 and the blue indicator 423 of the menus 422 and 424, respectively, combine to make green). Moreover, the additional core node 440 may be colored purple (i.e., indicated by the "P" associated with the additional core node 440 in FIGS. 4H-4I and 4L-4O) to indicate that the community links associated with the additional core node 440 are relevant only to the combination of search input selected from the causes and conditions menu 420 and the providers and plans menu 424 (i.e., the red indicator 419 and the blue indicator 423 of the menus 420 and 424, respectively, combine to make purple). It should be appreciated by those skilled in the art that one or more of the core nodes 428, 430, 432, 434, 436, 438, and 440 may not be displayed in the visual display 426 based on the search input provided through the menus 420, 422, and 424.

According to exemplary embodiments, when a user hovers on one of the core nodes 428, 430, 432, 434, 436, 438, or 440 provided by the visual display 426, a list of resulting community links 454 associated with the hovered on core node is displayed, as illustrated in FIG. 4I. The list of resulting community links 454 may be retrieved from the database 108 or from a direct search of the servers 112a-112n and provided via a pop-up display in connection with the associated core node or via any further display means to illustrate the community links associated with the selected node. The list of resulting community links 454 may be removed from the My Community window 404 once hovering on the core node ceases, or the list of resulting community links may remain displayed even after hovering on the core node ceases. According to exemplary embodiments, if one of the community links of the list of resulting community links 454 is selected, web content 456 corresponding to the selected community link is displayed on the My Community window 404, as illustrated in FIG. 4J. The corresponding web content 456 may be displayed in a portion of the My Community window 404, such as in place of the visual display 426, or may be displayed over the entirety of the My Community window.

If one or more of the core nodes 428, 430, 432, 434, 436, 438, or 440 is selected, such as by single or double clicking the node, a further visual display 460 may be provided via the My Community window 404, as illustrated in FIG. 4L. According to exemplary embodiments, the further visual display 460 includes the core nodes 428, 430, 432, 434, 436, 438, and 440 as illustrated in the visual display 426 as well as one or more branch nodes, such as branch nodes 462, associated with the one or more selected core nodes. As illustrated in FIG. 4L, all of the core nodes 428, 430, 432, 434, 436, 438, and 440 have been selected such that branch nodes associated with each of the core nodes 428, 430, 432, 434, 436, 438, and 440 are displayed. According to exemplary embodiments, the branch nodes, such as the branch nodes 462 associated with the core node 440, include further suggested community links that are variously related to the community links of the selected core nodes, such as the selected core node 440, and to the community links of other branch nodes associated with the core node 440 as illustrated by the lines connecting the branch nodes 462. The branch nodes 462 may be located closer and farther from the core node 462 and each other to indicate how relative each of the further suggested links are in comparison to the suggested links of the core node and of each other. The branch nodes, such as the branch nodes 462, may include an indicator, such as a shape, color, or code, which identifies the core node, such as the core node 440, for which the branch nodes are related. For example, as illustrated in FIG. 4L, the branch nodes 462 are colored purple (i.e., indicated by the "P" associated with the branch nodes 462 in FIGS. 4L-4O) to indicate that the branch nodes 462 are associated with the core node 440 which is also colored purple (i.e., indicated by the "P" associated with the core node 440). Additionally, the branch nodes, such as the branch nodes 462, may be smaller in size than the core nodes, such as the core node 440, to distinguish the branch nodes from the core nodes. In accordance with exemplary embodiments, one or more of the branch nodes 462, is associated with at least one community link also associated with the core node 440.

Similar to the visual display 426, if a branch node 462a of the further visual display 460 is selected, such as by hovering on the branch node, a list of suggested community links may be displayed via a pop-up display 464, as illustrated in FIG. 4M. The list of suggested community links may be retrieved from the database 108 or from a direct search of the servers 112a-112n and provided via the pop-up display 464 in connection with the associated branch node 462a or via any further display means to illustrate the community links associated with the selected branch node. The pop-up display 464 may also include a list of tags associated with the suggested community links provided by the display. The display 464 may be removed from the My Community window 404 once hovering on the branch node ceases, or the display may remain displayed even after hovering on the branch node ceases. According to exemplary embodiments, if one of the community links of the list of suggested community links in the display 464 is selected, web content corresponding to the selected community link is displayed on the My Community window 404. The corresponding web content may be displayed in a portion of the My Community window 404 or may be displayed over the entirety of the My Community window.

Although seven of the core nodes 428, 430, 432, 434, 436, 438, and 440 and a particular number of branch nodes are illustrated in FIGS. 4H-4O and discussed herein, it should be appreciated by those skilled in the art that any number of core nodes and branch nodes may be provided and displayed by the multi-view interface 114 depending on the number of primary categories defined for a particular business vertical, which in this example is three, and the number of additional relevant community links associated with each of the core nodes.

Referring back to FIG. 4H, the My Community window 404 may further include a list of recently visited web links

444 as well as a list of web links sponsored by a particular provider 448. According to exemplary embodiments, the My Community window 404 also includes an information area 446 which provides additional web content associated with search input provided by the menus 420, 422, and 424. As illustrated in FIG. 4H, the information area 446 may include web content provided by WIKIPEDIA which is associated with the search input of the menus 420, 422, and 424. When a user initially accesses the My Community window 404 of the multi-view interface 114, the URL associated with the web content provider, such as WIKIPEDIA, is called so that a website associated with the provider may be immediately displayed in the information area 446 of the My Community window 404. As search input is provided via the menus 420, 422, and 424, the search input may be provided to WIKIPEDIA such that the web content provided by WIKIPEDIA and displayed in the information area 446 corresponds to the search input provided via the My Community window 404.

In accordance with further embodiments, the My Community window 404 may include an instructional area 450 which provides links to instructional information regarding utilizing and interacting with the communities and information provided via the My Community window 404. For example, the instructional area 450 may include links to information regarding posting a comment on a community, launching a community, creating a WIKI, starting a blog, and any number of other links to instructional information for using and interacting with communities. The instructional area 450 may also include a rate and rank option which, according to exemplary embodiments, allows a user to rate and rank community links provided by the My Community window 404. Additionally, the instructional area 450 may include an other option which allows a user to provide community links which are associated with a given taxonomy category selected as search input but are not initially provided as resulting community links by the My Community window 404 when the search is performed. Although the list of user favorite communities 442, the visual display 426, the further visual display 460, the sponsored links 448, the list of recently visited links 444, the information area 446, and the instructional area 450 are illustrated as being provided in particular portions of the My Community window 404, it should be appreciated by those skilled in the art that each of the lists, displays, and areas may be maximized to cover the entirety of the My Community window.

According to exemplary embodiments, data provided in one of the windows 402-408 of the multi-view interface 114 may be selected by a user and provided to one or more of the other windows of the interface. For example, information provided in a community of the My Community window 404 may be selected by a user and provided to the My Messages window 406 such that an email is composed including the information selected and provided from the My Community window. When a user highlights data in one of the windows 402-408, copies the data, and drags the data to another one of the windows, the window selected by the user to receive the data may automatically be brought into focus to receive the data. Following the above example, when the user drags the information from the My Community window 404 to the My Messages window 406, the My Messages window may be brought into focus, while the My Community window is reduced, and the My Messages window may automatically provide a new email to receive and present the information provided to the My Messages window. According to further embodiments, a dialog box 458, as illustrated in FIG. 4K, may be provided prior to receiving the transferred content from one window of the multi-view interface 114 to another window prompting a user to verify whether the transferred content should actually be received. An editor application associated with each of the windows 402-408 may allow data from each of the windows 402-408 to be provided to each of the other windows of the interface 114.

Referring now to FIGS. 4N-4O, the My Community window 404 may further provide a current criteria list 806 including the primary taxonomy categories, such as the causes and conditions category 800, the treatments and tonics category 802, and the providers and plans category 804; and the related taxonomy search categories for each of the primary taxonomy categories that are currently available for selection by a user as search input via the causes and conditions drop down menu 420, the treatments and tonics drop down menu 422, and the providers and plans drop down menu 424. Additionally, the My Community window 404 may provide an other options list 810 including the primary taxonomy categories, such as the causes and conditions category 800, the treatments and tonics category 802, and the providers and plans category 804; and further including taxonomy search categories that are related to each of the primary taxonomy categories but which are not currently provided under either the causes and conditions drop down menu 420, the treatments and tonics drop down menu 422, or the providers and plans drop down menu 424 for selection by a user as search input. According to exemplary embodiments, the additional taxonomy search categories provided in the other options list 810 are associated with links to relevant content provided by the servers 112a-112n and stored in the database 108. The additional taxonomy search categories provided by the other options list 810 may change over time as the links and taxonomy stored in the database 108 are modified.

A user of the multi-view interface 114 may use the current criteria list 806 and the other options list 810 of the My Community window 404 to modify the taxonomy search categories provided under the causes and conditions drop down menu 420, the treatments and tonics drop down menu 422, and the providers and plans drop down menu 424. By modifying the taxonomy search categories, a user can continuously customize and modify the search input available for seeking links to content relevant to the search input. According to exemplary embodiments, the current taxonomy search categories provided in the current criteria list 806 and the taxonomy search categories provided in the other options list 810 are associated with an option button, such as a radio button, which can be selected and/or deselected by a user. When a user selects the option button associated with one or more of the current taxonomy search categories of the current criteria list 806 and selects a delete button 808 associated with the current criteria list, the selected search categories may be removed from the current criteria list and added to the other options list 810, and the same selected search categories may be removed from the taxonomy search categories, such as the taxonomy search categories 452, associated with the causes and conditions drop down menu 420, the treatments and tonics drop down menu 422, and the providers and plans drop down menu 424. When a user selects the option button associated with one or more of the taxonomy search categories of the other options list 810 and selects an add button 812 associated with the other options list, the selected search categories may be removed from the other options list and added to the current criteria list 806, and the same selected search categories may be added to the taxonomy search categories, such as the taxonomy search categories 452, associated with the causes and conditions drop down menu 420, the treatments and tonics drop down menu 422, and the providers and plans drop down menu 424.

For example, as illustrated in FIG. 4N, the taxonomy search categories 2 and 6 associated with the primary category 1 are selected from the current criteria list 806, and the taxonomy search categories C and F associated with the primary category 1 are selected from the other options list 810. When the delete button 808 associated with the current criteria list 806 is selected, then the search categories 2 and 6 under the primary category 1 are removed from the current criteria list 806 and added to the other options list 810 under the primary category 1, as illustrated in FIG. 4O. In addition, the search categories 2 and 6 of the taxonomy search categories 452 are removed, as illustrated in FIG. 4O. When the add button 812 associated with the other options list 810 is selected, then the search categories C and F under the primary category 1 are removed from the other options list 810 and added to the current criteria list 806 under the primary category 1 as well as to the taxonomy search categories 452, as illustrated in FIG. 4O.

Referring now to FIGS. 4P-4R and as discussed above, single sign on functionality may be provided by the multi-view interface 114 to allow the user to log in to all web services, such as web mail, communities, and medical websites, that are integrated with the interface when the user initially logs in to access the interface. According to exemplary embodiments, the My Settings window 410 of the multi-view interface 114 allows a user to setup and update sign on functionality to websites and web services integrated with the interface, view a list of websites and web services integrated with the interface such that single sign on is permitted, and view a list of websites and web services for which the user is currently accessing via single sign on through the interface.

As illustrated in FIG. 4P, the My Settings window 410 may provide a setup and update sign on option 470. In accordance with exemplary embodiments, the setup and update sign on option 470 includes a sign on category option 472 which allows a user to select a particular website or web service category such as, for example, web mail, blogs, and medical websites, for which the user would like to initiate single sign on functionality provided by the multi-view interface 114. It should be appreciated by those skilled in the art that the sign on category 472 may include any website or web service category which requires a sign on or log in prior to allowing access to information and content provided by the website or web service. Once a category provided by the sign on category 472 is selected, a user may select a particular website or web service, such as GMAIL, HOTMAIL, YAHOO, WEBMD, BLOGGER, or BLOGSPOT, associated with the selected category via a sign on service option 474. In accordance with exemplary embodiments, the setup and update sign on option 470 also includes a user/email identification field 476 and a password field 478 for receiving a username and/or user email address and a user password, respectively, associated with the particular website or web service selected via the sign on service option 474. After providing a username and password associated with a selected website or web service, a test button 483 may be selected to cause the multi-view interface 114 to connect to the URL associated with the selected website or web service and attempt to log in to the website or service using the username/email address from the user/email identification field 476 and the password from the password field 478. If the attempted log in is successful, then a pass indication may be provided in a pass option 480, and a user may select a save button 484 to associate and save the username/email address and password with the selected website or web service of the sign on service option 474. If the attempted log in is unsuccessful, then a fail indication may be provided in a fail option 482.

Referring now to FIG. 4Q, a user may view lists of available websites and web services integrated with the multi-view interface 114 such that single sign on is permitted for those websites and web services via a list available sign on option 486. According to exemplary embodiments, the list available sign on option 486 includes a sign on category option 488 which allows a user to select a particular website or web service category such as, for example, web mail, blogs, and medical websites, for which the user would like to view the corresponding websites and/or web services that are integrated with the multi-view interface 114 such that single sign on to the websites and/or web services is provided upon log in to the interface. The available, corresponding websites and/or web services may be displayed in an available list 490 of the list available sign on option 486.

A user may further view a list of websites and web services for which the user is currently accessing via single sign on through the multi-view interface 114 via a list my current sign on option 492, as illustrated in FIG. 4R. The list my current sign on option 492 may include a sign on category option 493 which allows a user to select a particular website or web service category such as, for example, web mail, blogs, and medical websites, for which the user would like to view the corresponding websites and/or web services that are currently accessed by the user via single sign on through the multi-view interface 114. According to exemplary embodiments, the site name, username/email address, and password associated with each corresponding website and/or web service is provided in an available list 494. A user may update one or more of the usernames/email addresses and/or passwords associated with the websites and/or web services provided in the available list 494 and then test the updated information by causing the multi-view interface 114 to connect to the URL associated with the selected website or web service and attempt to log in to the website or service using the updated username/email address and/or the updated passwords. If the attempted log in is successful, then a pass indication may be provided in a pass option 495, and a user may select an update button 497 to associate and save the updated username/email address and/or password with the selected website or web service. If the attempted log in is unsuccessful, then a fail indication may be provided in a fail option 496.

Figure 5A:
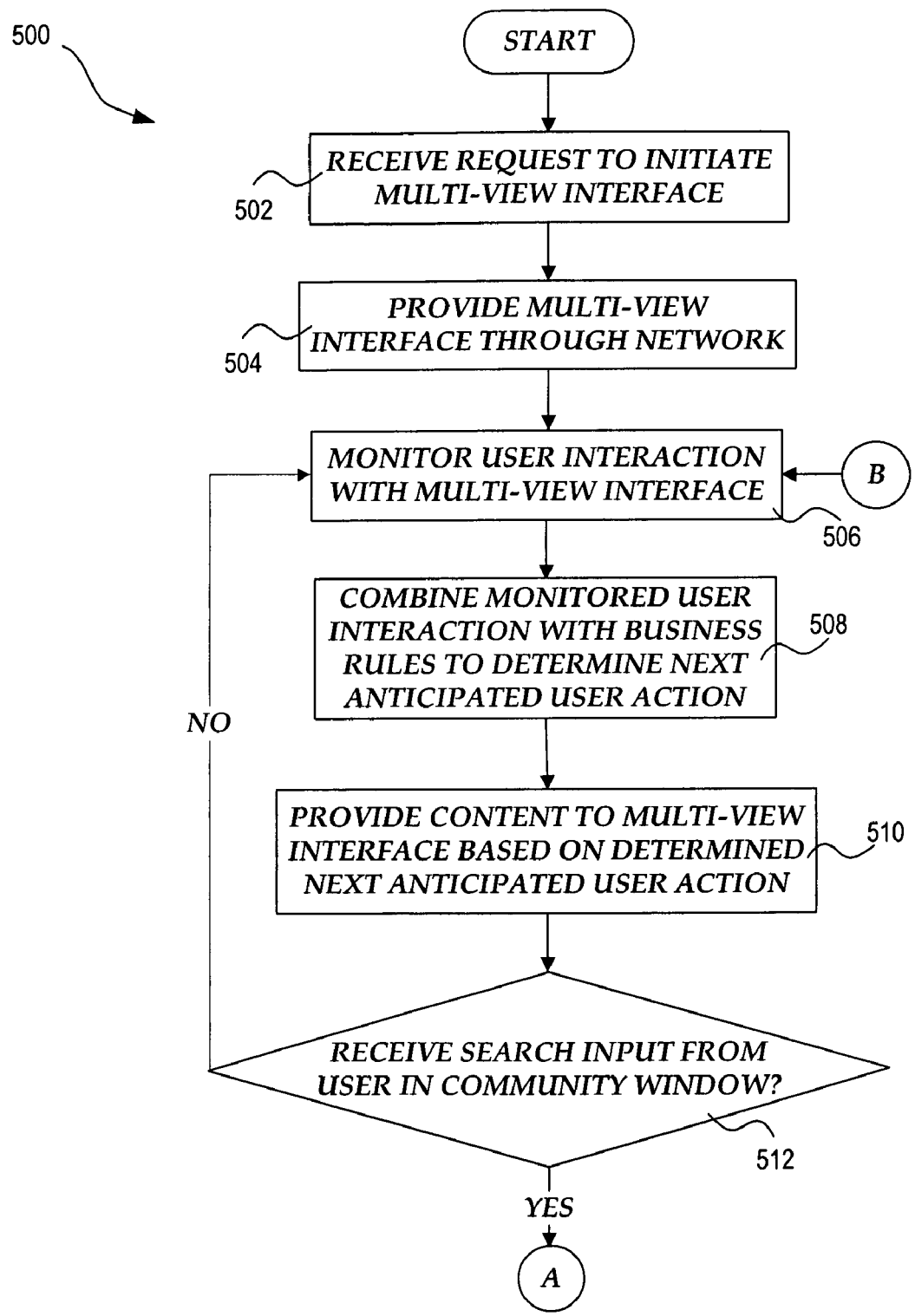
FIGS. 5A-5B are flowcharts illustrating a method for providing and managing a multi-view interface that is accessible through a network according to exemplary embodiments.
Figure 5B:
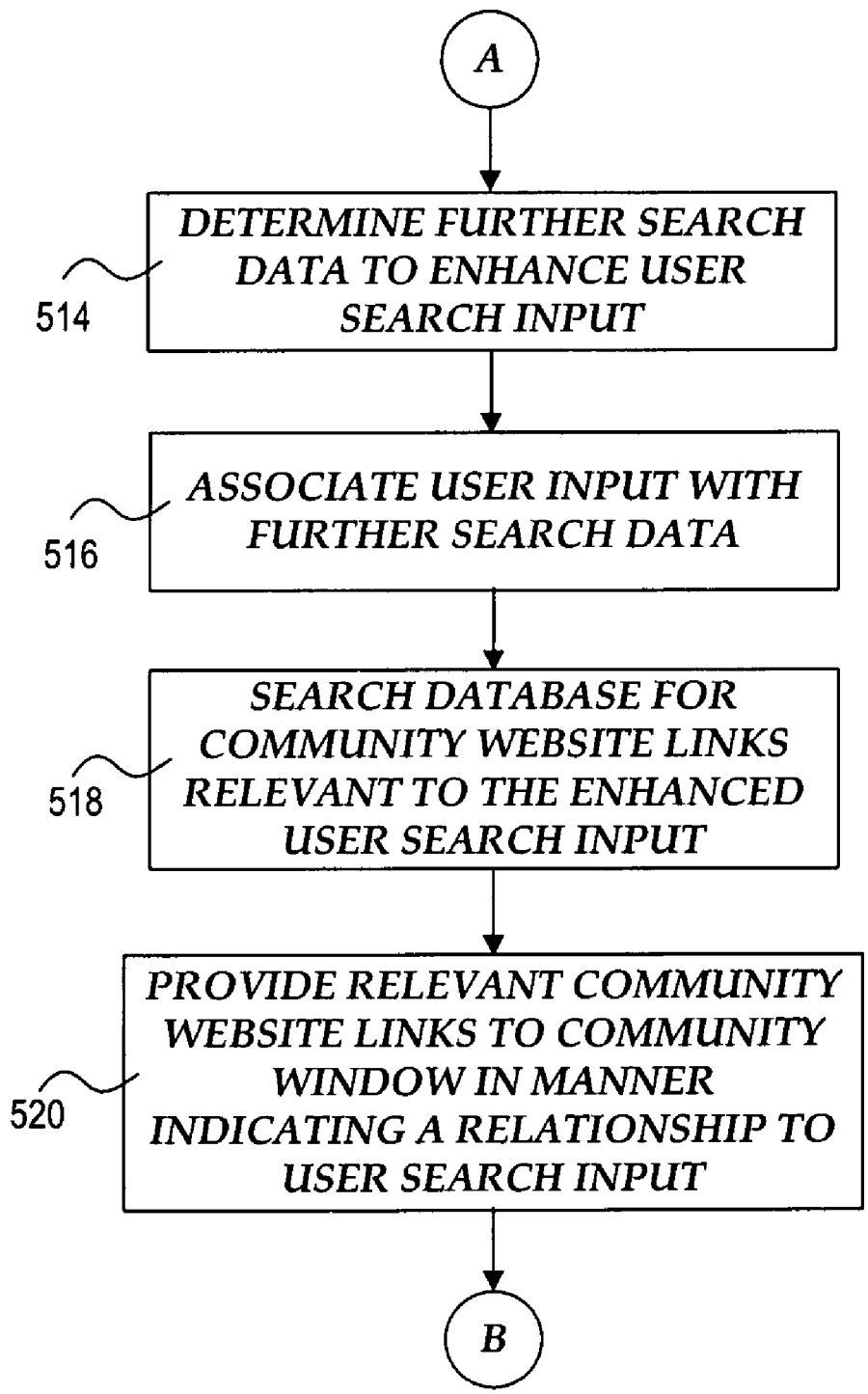

Referring now to FIGS. 5A-5B, additional details regarding the operation of the user device 102 and the multi-view interface server computer 106 will be described. In particular, FIGS. 5A-5B illustrate a routine 500 performed by the user device 102 and the multi-view interface server computer 106 for providing relevant content via the multi-view interface 114 to a user of the user device 102. The routine 500 begins at operation 502 where a request to initiate the multi-view interface 114 is received at the multi-view interface server computer 106. In response, at operation 504, the interface framework server module 244 may contact websites and applications provided by the server computer 112a-112n and associated with the particular requesting user and provide information from the associated websites and applications via the windows of the multi-view interface 114 which is provided to the user device 102 via the network 104. The interface framework server module 244 may also access the taxonomy associated with the requesting user and provide the taxonomy via the windows of the multi-view interface 114. The taxonomy may be stored in the database 108.

From operation 504, the routine 500 proceeds to operation 506, where the client-side monitor module 222 of the user device 102 monitors any user navigational interactions with the windows of the multi-view interface 114, and the server-side monitor module 302 monitors the tangible interactions of the user with the multi-view interface. At operation 508, the server-side monitor module 302 combines the navigational interactions of the user with the tangible interactions of the user as well as with business rules and logic provided by the context filter 304, the context search rules 306, and user profile information stored in the database 108 to determine a next anticipated action associated with the user. The server-side monitor module 302 may combine the navigational interactions of a user with tangible interactions performed by the user over any given time period. For example, the server-side monitor module 302 may combine the navigational interactions with tangible interactions performed by the user over the last twenty four hours or over the last five minutes to determine the next anticipated user action. The routine 500 proceeds from operation 508 to operation 510, where the inference engine 300 directs the multi-view interface server computer 106 to provide content via the multi-view interface 114 based on the determined next anticipated user action. The content provided based on the determined next anticipated user action may include any information capable of being provided via the windows 402-408 of the interface 114, and according to exemplary embodiments, includes advertisements.

From operation 510, the routine 500 proceeds to operation 512, where a determination is made whether a taxonomy category has been selected as user search input via the My Community window 404. If not, then the routine 500 proceeds back to operation 506, where the client-side monitor module 222 and server-side monitor module 302 continue to monitor for user interactions with the multi-view interface 114. If a taxonomy category selected as user search input is received at the My Community window 404, then the user search input is provided to the community search application 242, and the routine 500 proceeds to operation 514, where the community search application determines additional search information to include with the received user search input based on the business rules provided by the context metadata repository 308 of the inference engine 300. The routine 500 then proceeds to operation 516, where the community search application 242 associates the received taxonomy category selected as search input with the additional search information to create an enhanced search input. At operation 518, the community search application 242 uses the enhanced search input, including the taxonomy category selected as search input and the additional search data, to search the community links stored in the database 108 to locate communities relevant to the enhanced search input. As discussed above, the community links stored in the database 108 may be associated with tags that accurately describe the content provided by the community links and are associated with the taxonomy categories used as search input. The taxonomy category selected by a user as search input may be compared to the tags associated with the community links to determine which of the community links are relevant to the provided search input. Additionally or alternatively, the community search application 242 may use the enhanced search input to search content on the Internet provided by servers, such as the server computers 112a-112n, via existing search engines to locate communities relevant to the enhanced search input.

Once relevant communities are located, the community search application 242 may retrieve links to the relevant communities from the database 108 and/or directly from a search of content provided by the server computers 112a-112n and provide the links to the My Community window 404 of the multi-view interface 114 displayed on the user device 102 at operation 520. As discussed above, the community search application 242 may provide lists or displays, such as the visual displays 426 and 460, illustrating the resulting suggested community links based on the performed specialized search in a manner which demonstrates how relative each suggested community is to the search input; how active and popular each suggested community is based on, for example, the recentness of the latest post and the volume of posts to the community; the relationship between the suggested community links; and the primary category or combination of primary categories for which the resulting suggested community links are related. From operation 520, the routine 500 proceeds back to operation 506, where the client-side monitor module 222 and server-side monitor module 302 continue to monitor for user interactions with the multi-view interface 114.

Figure 6A:
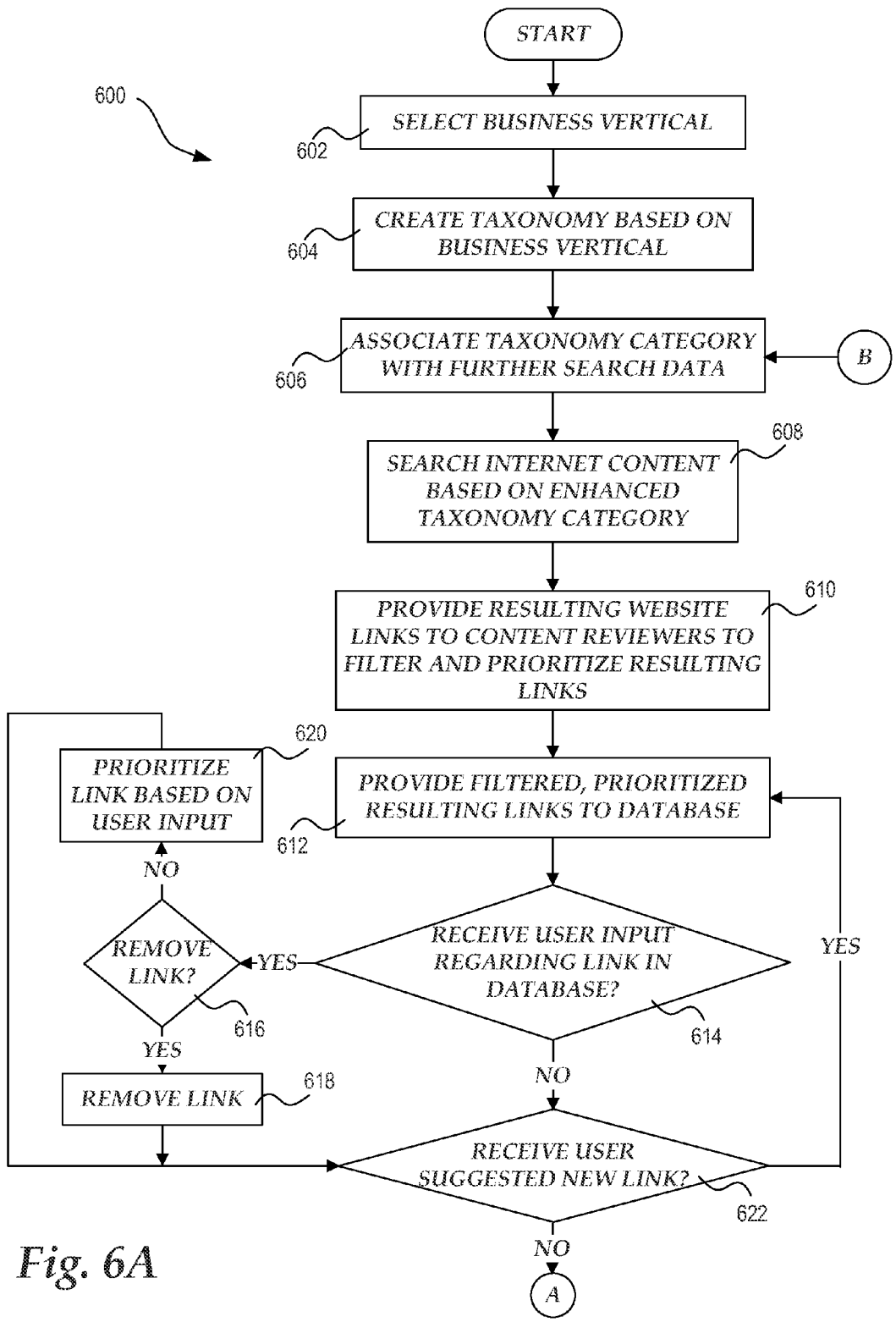
FIGS. 6A-6B are flowcharts illustrating a method for creating taxonomy search input options and associating links to Internet content relevant to the taxonomy search input options according to exemplary embodiments.
Figure 6B:
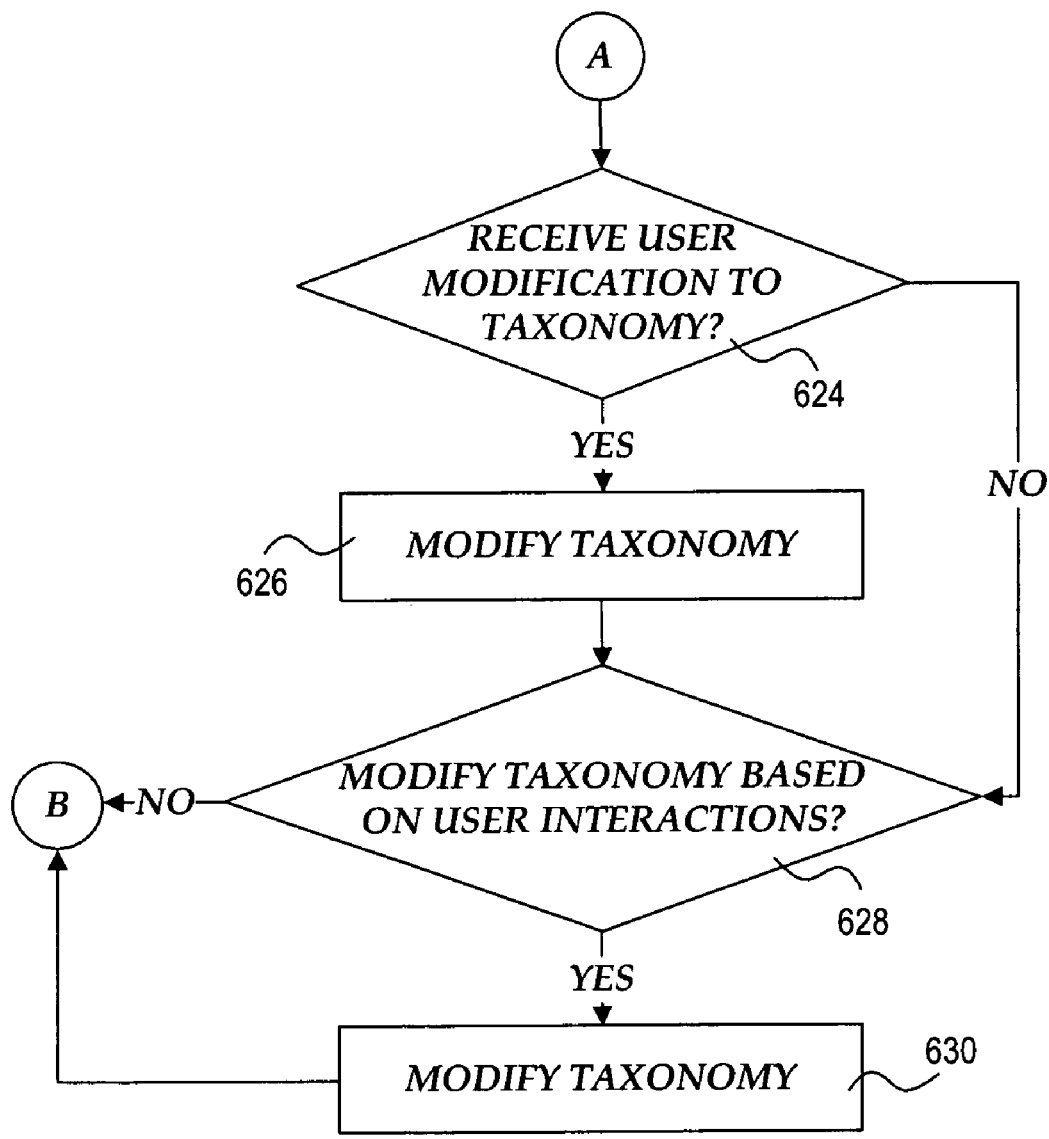

As discussed above, the database 108 includes community links to content on the Internet provided by servers, such as the server computers 112a-112n, relevant to the taxonomy categories provided by the My Community window 404. FIGS. 6A-6B illustrate an exemplary embodiment of a routine 600 for creating a taxonomy based on a particular business vertical, such as disease management, and providing community links to community websites supplied by the server computers 112a-112n which are relevant to the created taxonomy.

The routine 600 begins at an operation 602, where a business vertical is selected. The business vertical described herein is disease management. It should be appreciated by those skilled in the art that any business vertical may be selected. From operation 602, the routine 600 proceeds to operation 604, where a taxonomy based on the business vertical is received. As used herein, a taxonomy includes a hierarchy of categories associated with the business vertical. According to exemplary embodiments, the taxonomy is initially created by selecting three primary categories associated with a particular business vertical which together ultimately define the services and/or products provided by the business vertical and from which the remaining hierarchy of categories associated with the business vertical is generated. For example, for the business vertical disease management, the three primary categories of the taxonomy include causes and conditions 800, treatments and tonics 802, and providers and plans 804, as illustrated in FIG. 4H. From the causes and conditions category 800, the taxonomy may include conditions such as diabetes, cancer, hypertension, heart disease, and so forth. From each of these conditions, the taxonomy may further categorize the condition such as further categorizing diabetes into Type 1 and Type 2. It should be appreciated by those skilled in the art that any number of categories may be selected initially as the primary categories used to generate the taxonomy for a particular business vertical and that any number of additional categories may flow from the primary categories.

In order to provide community links associated with the categories of the taxonomy for the business vertical, a search of Internet content provided by the servers 112a-112n may be performed. From operation 604, the routine 600 proceeds to operation 606, where the community search application 242 enhances one or more categories of the taxonomy by associating additional keywords with the categories such that a more direct and specialized search of the network-based content is performed. The additional keywords associated with the taxonomy categories may be determined based on business rules provided by the inference engine 300. The routine 600 continues at operation 608, where the community search application 242 searches the Internet content for communities relevant to the enhanced taxonomy categories. From operation 608, the routine 600 proceeds to operation 610, where the community search application 242 provides the resulting community links found during the search that are relevant to the enhanced taxonomy categories to content reviewers to review the content of the communities and filter and prioritize the links based on the relevancy of the content of the links to the enhanced taxonomy categories used to search the Internet content. The review of the links may be performed by human content reviewers, such as experts in the particular taxonomy categories, or via an application associated with the multi-view interface server computer 106 which may filter and prioritize the links based on parameters such the amount of exact matches between the content of the community link and the enhanced taxonomy categories used to search the amount of activity associated with the community link, and how current the latest posting associated with the community link is. The routine 600 then proceeds to operation 612, where the multi-view interface server computer 106 receives the filtered and prioritized resulting community links from the content reviewers and provides the filtered, prioritized resulting community links to the database 108.

As noted above, the instructional area 450 of the My Community window 404 may also include a rate and rank option which, according to exemplary embodiments, allows a user to rate and rank community links provided by the My Community window. At operation 614, the multi-view interface server computer 106 determines whether user input regarding a community link provided by the My Community window 404 is received via, for example, the rate and rank option provided by the instructional area 450. If a determination is made that user input has been received via the rate and rank option, then the routine 600 proceeds to operation 616 where a further determination is made whether the user input is to remove the link from the database 108. If a determination is made that the user input is to remove the link from the database, the routine 600 proceeds to operation 618, where the multi-view interface server computer 106 is removed from the database 108. The routine 600 then proceeds to operation 622 which is described below. Back at operation 616, if a determination is made that the user input is not to remove the link from the database 108, then the routine 600 proceeds to operation 620, where the link is re-filtered and reprioritized within the database 108 based on the user input provided via the instructional area 450. The routine 600 then proceeds to operation 622.

As further noted above, the instructional area 450 may also include an other option which allows a user to provide community links which are associated with a given taxonomy category selected as search input but are not initially provided as resulting community links by the My Community window 404 when a search is performed. Back at operation 614, if the multi-view interface server computer 106 determines that user input regarding a community link provided by the My Community window 404 is not received via the rate and rank option of the instructional area 450, the routine 600 proceeds directly to operation 622, where the multi-view interface server computer determines whether user input providing a suggested new community link is received via, for example, the other option provided by the instructional area. If the multi-view interface server computer 106 determines that user input suggesting a new community link is received at the other option, the routine 600 proceeds back to operation 612, where the new community link is provided to the database 108.

If, at operation 622, a determination is made that user input suggesting a new community link is not received at the other option of the instructional area 450, the routine 600 proceeds to operation 624, where the multi-view interface server computer 106 determines whether a user modification to the taxonomy is received. As discussed above, if a user is unable to find a particular taxonomy category under, for example, the causes and conditions drop down menu 420 of the My Community window 404, the user can select an other option provided by the causes and conditions drop down menu and provide the name of the particular cause. If a determination is made that the user has not modified the taxonomy by inputting a new category via the other option, then the routine 600 proceeds to operation 628, described below. If, however, the user has modified the taxonomy by inputting a new category via the other option, then the routine 600 proceeds to operation 626, where the taxonomy is modified to include the new category provided via the other option. The new category may be immediately added to the causes and conditions drop down menu 420, or the new category may be added to the causes and conditions drop down menu within a predetermined amount of time, such as within twenty four hours.

From operation 626, the routine 600 proceeds to operation 628, where a determination is made whether the taxonomy should be modified based on user interactions. For example, the taxonomy engine 310 may receive user interaction information from the inference engine 300 and determine whether categories of the taxonomy and/or the arrangement of the taxonomy categories as provided by the multi-view interface 114 should be modified. If, at operation 628, a determination is made that the taxonomy should not be modified based on user interactions, the routine 600 proceeds back to operation 606. If, however, a determination is made that the taxonomy should be modified based on user interactions, then the routine 600 proceeds to operation 630, where the taxonomy engine 310 modifies the taxonomy based on the user interactions. The routine 600 then proceeds back to operation 606.

It will be appreciated that exemplary embodiments provide methods, systems, apparatus, and computer-readable medium for providing and managing a multi-view interface that is accessible through a network and that provides one or more windows through which users can send and receive electronic messages, view and interact with relevant communities over the network, search for and interact with information provided over the network, and manage personal content associated with the users, such as medical issues associated with the users. Although exemplary embodiments have been described in language specific to computer structural features, methodological acts, and by computer readable media, it is to be understood that the embodiments are not necessarily limited to the specific structures, acts, or media described. Therefore, the specific structural features, acts, and mediums are disclosed as exemplary embodiments.

The various embodiments described above are provided by way of illustration only and should not be construed to limit the invention. Those skilled in the art will readily recognize various modifications and changes that may be made to the embodiments without following the example embodiments and applications illustrated and described herein.

What is claimed is:

1. A method for accessing information over a network, the method comprising:

providing a single interface including a plurality of windows;

monitoring user interactions with the plurality of windows;

providing information from one or more network resources to the single interface based at least in part on the monitored user interactions with the plurality of windows;

receiving categories defining a business vertical,
   wherein a first category of the categories is associated with a first color,
   wherein a second category of the categories is associated with a second color, and
   wherein a third category of the categories is associated with a third color;

receiving search input through one of the plurality of windows, the search input associated with one or more of the categories;

searching for network-based information provided by the one or more network resources that is associated with the search input; and displaying a result of searching for the network-based information in a manner that indicates which of the categories or a combination of the categories is associated with the result, wherein displaying the result comprises:
   displaying the result in association with the first color if the result is associated only with the first category,
   displaying the result in association with the second color if the result is associated only with the second category,
   displaying the result in association with the third color if the result is associated only with the third category,
   displaying the result in association with a fourth color if the result is associated only with the combination of the first category and the second category,
   displaying the result in association with a fifth color if the result is associated only with the combination of the second category and the third category,
   displaying the result in association with a sixth color if the result is associated only with the combination of the first category and the third category, and
   displaying the result in association with a seventh color if the result is associated with the combination of the first category, the second category, and the third category.

2. The method of claim 1, wherein each of the plurality of windows is operative to receive the information simultaneously and independently.

3. The method of claim 1, wherein monitoring user interactions with the plurality of windows includes monitoring information previously provided to the single interface.

4. The method of claim 1, wherein monitoring user interactions with the plurality of windows includes monitoring navigational user interactions and tangible user interactions.

5. The method of claim 4, further comprising:
associating each of the monitored navigational user interactions with a code uniquely identifying each of the monitored navigational user interactions; and
creating an identification code string based on the code associated with each of the monitored navigational user interactions.

6. The method of claim 5, further comprising:
receiving the identification code string;
determining the navigational user interactions corresponding to the identification code string;
combining the determined navigational user interactions with the monitored tangible user interactions;
determining a next anticipated user interaction based on the combined navigational and tangible user interactions; and
providing the information to one or more of the plurality of windows of the single interface based on the determined next anticipated user interaction.

7. The method of claim 1, further comprising:
enhancing the search input received.

8. The method of claim 7, wherein enhancing the search input received comprises associating the search input received with additional search information relevant to the business vertical.

9. The method of claim 1, wherein searching for network-based information provided by the one or more network resources that is associated with the search input comprises utilizing one or more existing search engines to search the one or more network resources for the network-based information associated with the search input.

10. The method of claim 1, wherein providing a single interface including a plurality of windows includes:
maximizing a first window of the plurality of windows when focus is placed on the first window; and
minimizing remaining windows of the plurality of windows when focus is placed on the first window.

11. A non-transitory computer-readable storage medium having computer-executable instructions stored thereon which, when executed by a computer, cause the computer to:
provide a single interface including a plurality of windows;
receive categories defining a business vertical,
   wherein a first category of the categories is associated with a first color,
   wherein a second category of the categories is associated with a second color, and
   wherein a third category of the categories is associated with a third color;
monitor user interactions with the plurality of windows, at least one of the monitored user interactions including providing a search input associated with one or more of the categories;
receive the search input through one of the plurality of windows of the single interface;
enhance the search input received; and
display a result based at least in part on the search input enhanced in a manner that indicates which of the categories or a combination of the categories is associated with the result, wherein displaying the result comprises:
   displaying the result in association with the first color if the result is associated only with the first category,
   displaying the result in association with the second color if the result is associated only with the second category,
   displaying the result in association with the third color if the result is associated only with the third category,
   displaying the result in association with a fourth color if the result is associated only with the combination of the first category and the second category,
   displaying the result in association with a fifth color if the result is associated only with the combination of the second category and the third category,
   displaying the result in association with a sixth color if the result is associated only with the combination of the first category and the third category, and
   displaying the result in association with a seventh color if the result is associated with the combination of the first category, the second category, and the third category.

12. The non-transitory computer-readable storage medium of claim 11, wherein the search input enhanced includes the search input received and additional search information relevant to the business vertical.

13. The non-transitory computer-readable storage medium of claim 11, wherein the user interactions monitored include navigational user interactions and tangible user interactions.

14. The non-transitory computer-readable storage medium of claim 13, comprising further computer-readable instructions which, when executed by the computer, cause the computer to:
- associate each of the navigational user interactions with a code uniquely identifying each of the navigational user interactions; and
- create an identification code string based on the code associated with each of the navigational user interactions.

15. The non-transitory computer-readable storage medium of claim 14, comprising further computer-readable instructions which, when executed by the computer, cause the computer to:
- receive the identification code string;
- determine the navigational user interactions corresponding to the identification code string;
- combine the determined navigational user interactions with the tangible user interactions;
- determine a next anticipated user interaction based on the combined navigational and tangible user interactions; and
- provide the information to one or more of the plurality of windows of the single interface based on the determined next anticipated user interaction.

16. A method for providing network-based information, the method comprising:
- receiving categories defining a business vertical,
  - wherein a first category of the categories is associated with a first color, the first color includes red,
  - wherein a second category of the categories is associated with a second color, the second color includes yellow, and
  - wherein a third category of the categories is associated with a third color, the third color includes blue;
- receiving search input associated with one or more of the categories;
- searching for network-based information provided by one or more network resources that is associated with the search input; and
- displaying a result of searching for the network-based information in a manner that indicates which of the categories or a combination of the categories is associated with the result, wherein displaying a result of searching for the network-based information in a manner that indicates which of the categories or a combination of the categories is associated with the result further comprises:
  - displaying the result in association with the first color if the result is associated only with the first category,
  - displaying the result in association with the second color if the result is associated only with the second category,
  - displaying the result in association with the third color if the result is associated only with the third category,
  - displaying the result in association with a fourth color if the result is associated only with the combination of the first category and the second category, the fourth color includes orange,
  - displaying the result in association with a fifth color if the result is associated only with the combination of the second category and the third category, the fifth color includes green,
  - displaying the result in association with a sixth color if the result is associated only with the combination of the first category and the third category, the sixth color includes purple, and
  - displaying the result in association with a seventh color if the result is associated with the combination of the first category, the second category, and the third category, the seventh color includes white.

* * * * *